(12) United States Patent
Luethy et al.

(10) Patent No.: US 12,496,582 B2
(45) Date of Patent: Dec. 16, 2025

(54) SYSTEMS FOR DELIVERY OF A LIQUID TO AND REMOVAL OF A LIQUID FROM A SAMPLE

(71) Applicant: Instapath, Inc., Houston, TX (US)

(72) Inventors: Samuel Jacob Luethy, Philadelphia, PA (US); David Benjamin Tulman, Houston, TX (US); Jonathon Quincy Brown, New Orleans, LA (US); Mei Wang, Austin, TX (US)

(73) Assignee: Instapath, Inc., Houston, TX (US)

( * ) Notice: Subject to any disclaimer, the term of this patent is extended or adjusted under 35 U.S.C. 154(b) by 745 days.

(21) Appl. No.: 17/469,961

(22) Filed: Sep. 9, 2021

(65) Prior Publication Data
US 2022/0072544 A1 Mar. 10, 2022

Related U.S. Application Data

(60) Provisional application No. 63/076,464, filed on Sep. 10, 2020.

(51) Int. Cl.
*B01L 3/00* (2006.01)
*G01N 33/487* (2006.01)
*G02B 21/34* (2006.01)

(52) U.S. Cl.
CPC ... *B01L 3/502738* (2013.01); *B01L 3/502715* (2013.01); *B01L 2200/027* (2013.01);
(Continued)

(58) Field of Classification Search
CPC ......... B01L 3/502738; B01L 3/502715; B01L 3/527; B01L 2200/027; B01L 2200/16;
(Continued)

(56) References Cited

U.S. PATENT DOCUMENTS

| 6,418,236 B1 | 7/2002 | Ellis et al. |
| 6,998,270 B2 | 2/2006 | Tseung et al. |

(Continued)

FOREIGN PATENT DOCUMENTS

| CA | 3 095 932 | 10/2019 |
| RU | 1777033 C | 11/1992 |

(Continued)

OTHER PUBLICATIONS

Notification of Transmittal of the International Search Report and the Written Opinion of the International Searching Authority, or the Declaration, PCT/US2021/049548, Nov. 25, 2021. 7 pages.
(Continued)

*Primary Examiner* — Maris R Kessel
*Assistant Examiner* — Alea N. Martin
(74) *Attorney, Agent, or Firm* — Stanek Lemon Crouse & Meeks, PA

(57) ABSTRACT

A system for delivery of liquid to and removal of liquid from a sample is provided. The system includes a primary device that contains the sample and at least one valve configured to allow liquid to be delivered to and removed from the sample; at least one reservoir that is configured to receive a volume of liquid; a secondary device including at least one port configured to receive the at least one reservoir and configured to be coupled to the primary device; and a tertiary device configured to receive the secondary device and comprising mechanical modules that deliver the volume of liquid from the at least one reservoir to the sample and remove the volume of liquid from the sample. Positioning the primary device in the secondary device causes the volume of liquid in the at least one reservoir to be delivered to the sample contained within the primary device.

16 Claims, 37 Drawing Sheets

(52) U.S. Cl.
CPC .............. *B01L 2300/0822* (2013.01); *B01L 2400/0605* (2013.01); *G01N 33/487* (2013.01); *G02B 21/34* (2013.01)

(58) Field of Classification Search
CPC ..... B01L 2300/0822; B01L 2400/0605; B01L 2400/0478; B01L 2400/0487; G01N 33/487; G02B 21/34
See application file for complete search history.

(56) References Cited

U.S. PATENT DOCUMENTS

| | | | |
|---|---|---|---|
| 7,936,912 | B2 | 5/2011 | Tohma et al. |
| 2003/0129756 | A1* | 7/2003 | Thorne, IV ............... B01L 9/52 422/65 |
| 2007/0077550 | A1 | 4/2007 | Tohma et al. |
| 2009/0269799 | A1 | 10/2009 | Winkelman et al. |
| 2010/0120083 | A1 | 5/2010 | Ritzen et al. |
| 2011/0157349 | A1 | 6/2011 | Yamamoto et al. |
| 2012/0177543 | A1 | 7/2012 | Battrell et al. |
| 2013/0071858 | A1 | 3/2013 | Bui et al. |
| 2014/0051118 | A1 | 2/2014 | Matthiesen et al. |
| 2014/0349381 | A1 | 11/2014 | Battrell et al. |
| 2015/0346097 | A1 | 12/2015 | Battrell et al. |
| 2016/0076072 | A1 | 3/2016 | Lastovich et al. |
| 2016/0282375 | A1 | 9/2016 | Barnett |
| 2016/0291045 | A1* | 10/2016 | Czarnecki .......... G01N 35/1011 |
| 2016/0370264 | A1 | 12/2016 | Campbell |
| 2019/0331560 | A1* | 10/2019 | Luethy ..................... B01L 9/52 |

FOREIGN PATENT DOCUMENTS

| | | |
|---|---|---|
| WO | WO 99/12057 | 3/1999 |
| WO | WO 2018/009920 A1 | 1/2018 |

OTHER PUBLICATIONS

Extended European Search Report, EP 19781705.9, Dec. 17, 2021, 11 pages.
Notification Concerning Transmittal of Copy of International Preliminary Report on Patentability, PCT/US2019/025988, Oct. 15, 2020, 6 pages.
Notification of Transmittal of the International Search Report and the Written Opinion, PCT/US2019/025988, Jul. 4, 2019, 7 pages.

* cited by examiner

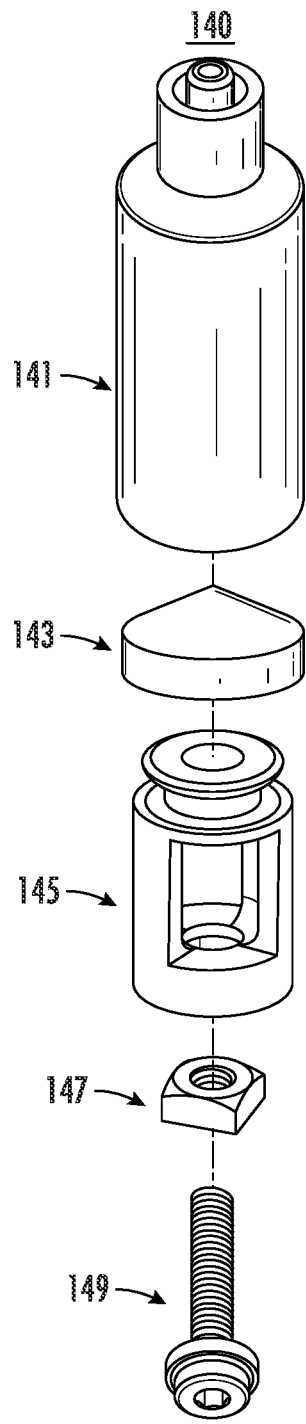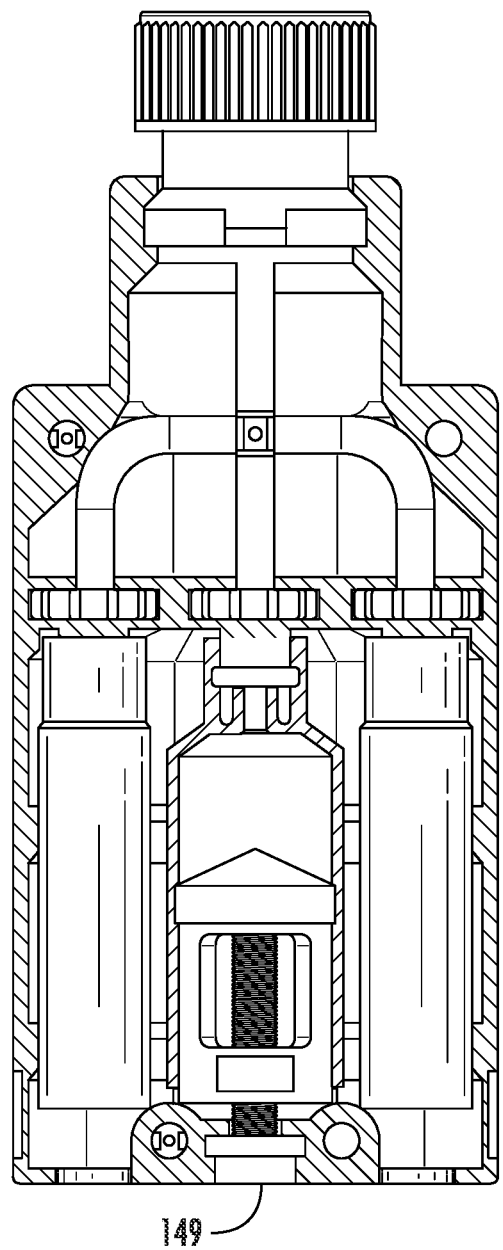
FIG. 4A
FIG. 4B

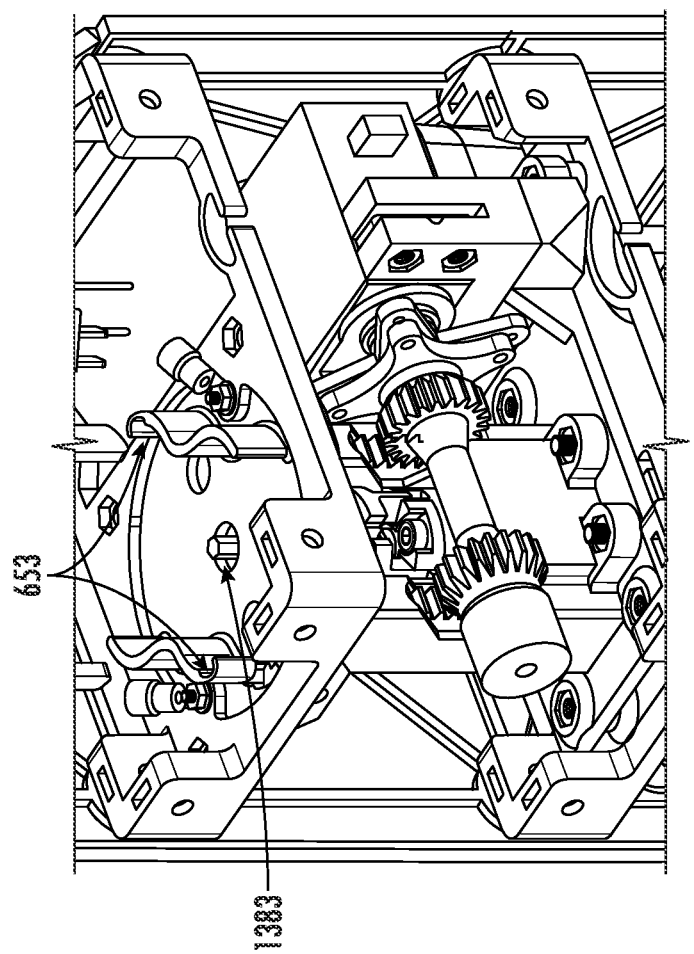
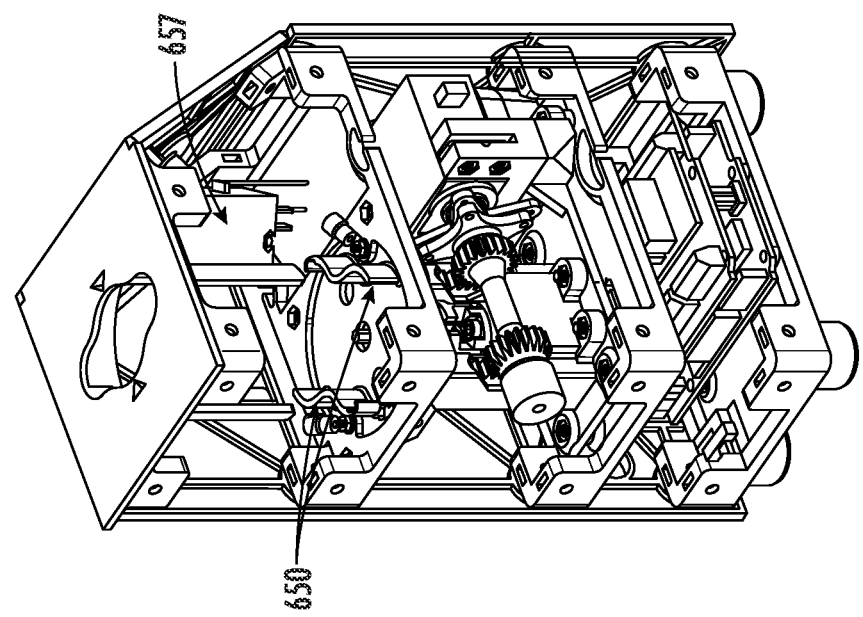

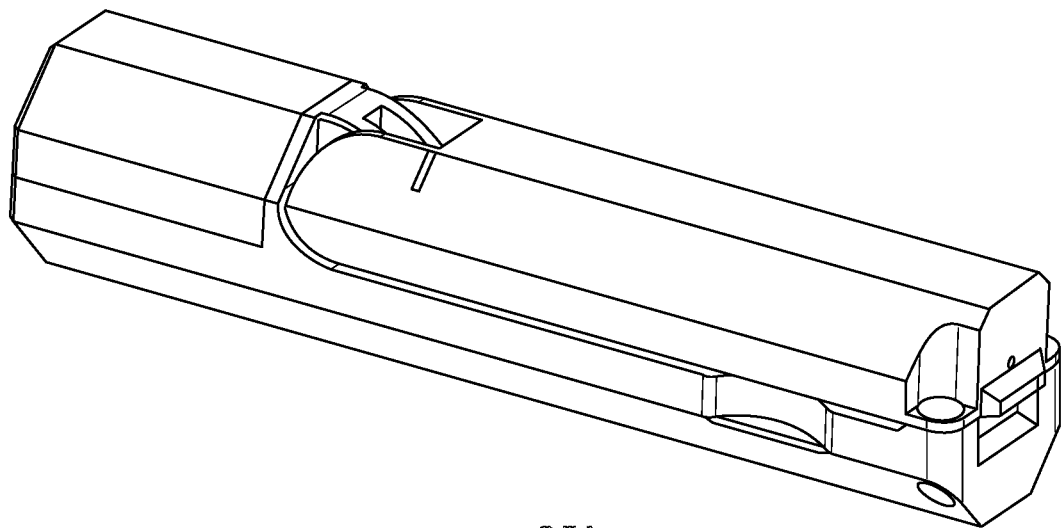
FIG. 35A
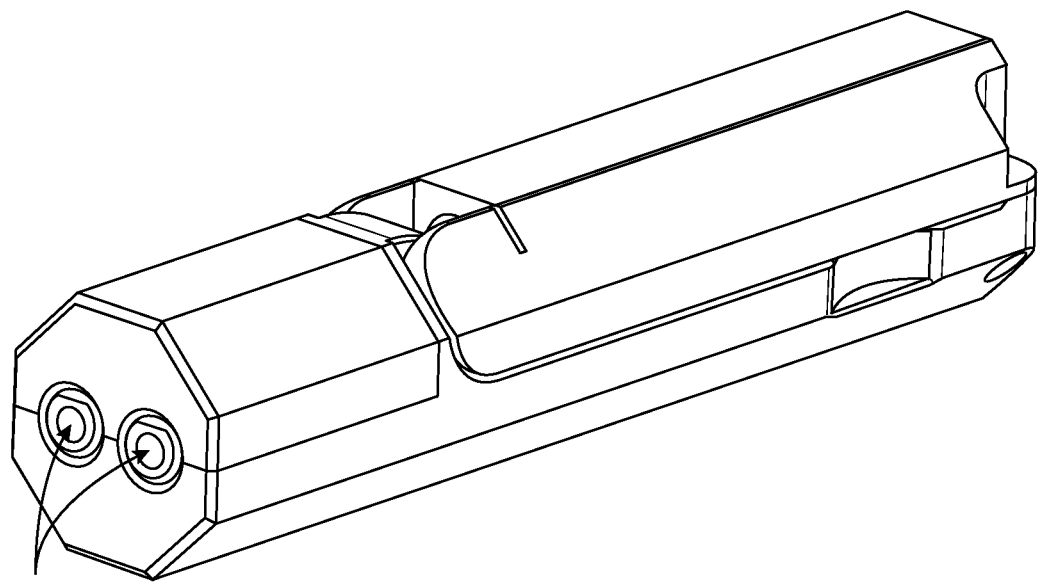
3554   FIG. 35B

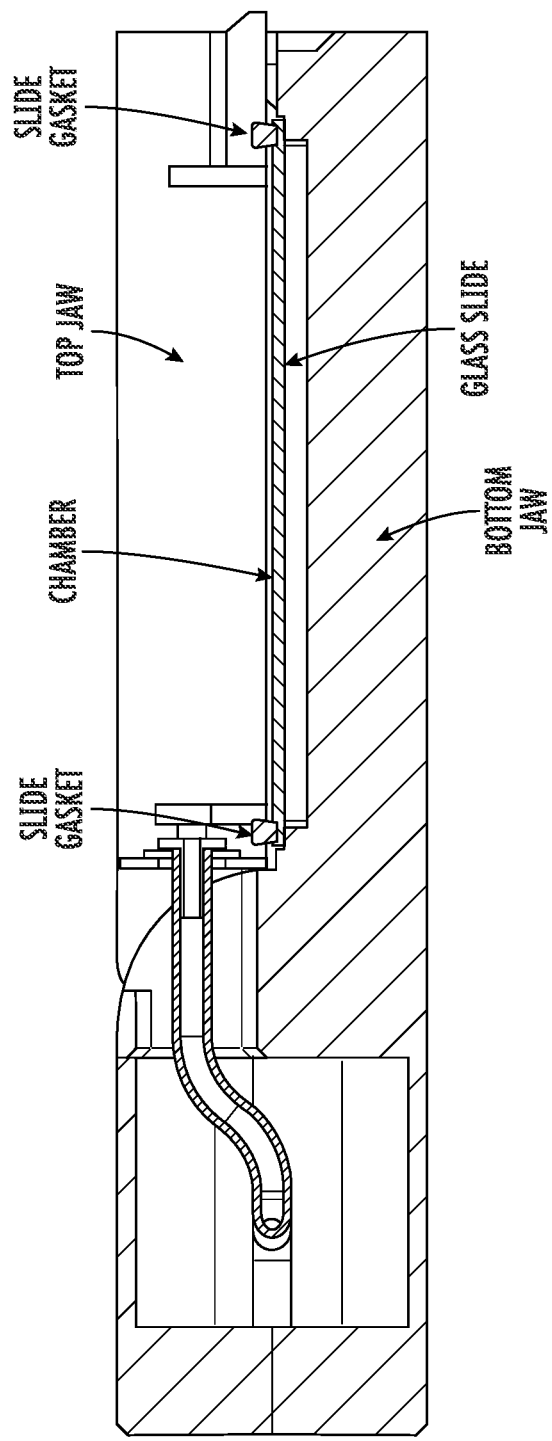

SYSTEMS FOR DELIVERY OF A LIQUID TO AND REMOVAL OF A LIQUID FROM A SAMPLE

CLAIM OF PRIORITY

The present application claims priority to U.S. Provisional Application Ser. No. 63/076,464, filed on Sep. 10, 2020, entitled System for Delivery and Removal of a Liquid from a Chamber, the contents of which is hereby incorporated herein by reference as if set forth in its entirety.

FIELD

This present inventive concept relates generally delivery of liquids and, more particularly, to delivery and removal of liquids to and from a sample.

BACKGROUND

Conventional tools for diagnosing biological tissues are generally slow, inefficient, destructive, and inaccurate. These conventional methods may take more than twenty-four hours to process a sample and may require multiple complicated procedures. Improved methods are desired.

SUMMARY

Some embodiments of the present inventive concept provide a system for delivery of liquid to and removal of liquid from a sample. The system includes a primary device that contains the sample and at least one valve configured to allow liquid to be delivered to and removed from the sample; at least one reservoir that is configured to receive a volume of liquid; a secondary device including at least one port configured to receive the at least one reservoir and configured to be coupled to the primary device; and a tertiary device configured to receive the secondary device and comprising mechanical modules that deliver the volume of liquid from the at least one reservoir to the sample and remove the volume of liquid from the sample. Positioning the primary device in the secondary device causes the volume of liquid in the at least one reservoir to be delivered to the sample contained within the primary device.

Further embodiments of the present inventive concept provide a system for delivery of liquid to and removal of liquid from a sample, the system including a primary device that contains the sample and at least one port configured to allow liquid to be delivered to and removed from the sample, the primary device comprising a chamber for the sample and at least one reservoir including a volume of liquid; a secondary device including at least one port configured to receive the primary device and comprising mechanical modules that deliver the volume of liquid from the at least one reservoir in the primary device to the sample and remove the volume of liquid from the sample. Positioning the primary device in the secondary device causes the volume of liquid in the at least one reservoir to be delivered to the sample contained within the primary device.

BRIEF DESCRIPTION OF THE DRAWINGS

FIG. 4A is an exploded view of a second liquid reservoir in accordance with some embodiments of the present inventive concept.

FIG. 4B is a cut away cross section of the primary device illustrating the secondary liquid reservoir screw held in place by the shell in accordance with some embodiments of the present inventive concept.

FIGS. 6A through 6B are cutaway cross sections of the secondary device illustrating various features therein in accordance with some embodiments of the present inventive concept.

FIGS. 35A and 35B are diagrams illustrating the primary device of FIGS. 34A and 34B in a closed position in accordance with some embodiments of the present inventive concept.

FIG. 36 is a cross section of a slide compatible primary device in accordance with some embodiments of the present inventive concept.

DETAILED DESCRIPTION

Figure 1C:
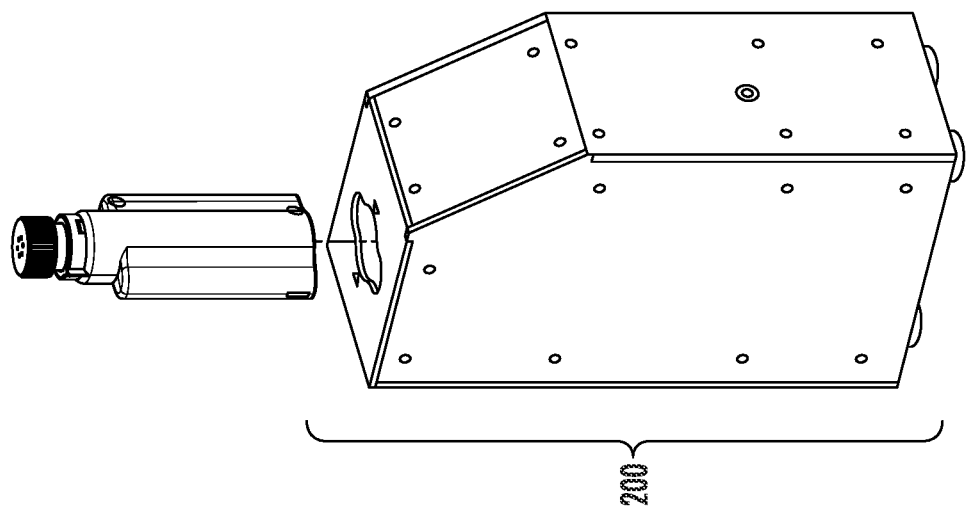
FIG. 1C is a diagram illustrating a secondary device receiving the primary device in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, conventional tools for diagnosing biopsies are generally slow, inefficient, destructive and inaccurate and improved methods and systems for processing biopsies are desired. Commonly assigned U.S. patent application Ser. No. 16/376,104, incorporated by reference above, discusses biopsy staining kits and the various elements associated therewith. In particular, a staining storage assembly and related stain transport tubes are discussed therein. Some embodiments of the present inventive concept provide a liquid delivery and removal system that may be used in accordance with embodiments discussed in the Assignee's previously filed patent application. However, although embodiments discussed herein are directed to liquid delivery and removal to a biological sample, embodiments of the present inventive concept are not limited thereto. For example, the methods and systems discussed herein may be used in any environment where these methods and systems are deemed useful without departing from the scope of the present inventive concept.

As discussed above, conventional tools for diagnosing biological tissues are generally slow, inefficient, destructive, and inaccurate. These conventional methods may take more than twenty-four hours to process a sample and may require multiple complicated procedures. Accordingly, some embodiments of the present inventive concept provide methods, systems and devices for delivery and removal of liquid from a chamber. This process may be used to improve methods of diagnosing biological tissue as will be discussed herein.

Some embodiments of the present inventive concept provide a system including a chamber, a primary liquid reservoir, a secondary liquid reservoir, a liquid delivery mechanism, and a liquid removal mechanism. In some embodiments, this system is used to deliver and remove "liquid" from the chamber. It will be understood that this liquid could be any type of liquid without departing from the scope of the present inventive concept. During operation, the primary liquid reservoir interacts with the liquid delivery mechanism. This interaction causes liquid from the primary liquid reservoir to be delivered to the chamber. The liquid removal mechanism interacts with the secondary liquid reservoir to move the liquid from the chamber into the secondary liquid reservoir. Some embodiments also provide modular elements which can be switched out of the system as will be discussed further below.

Figure 1B:
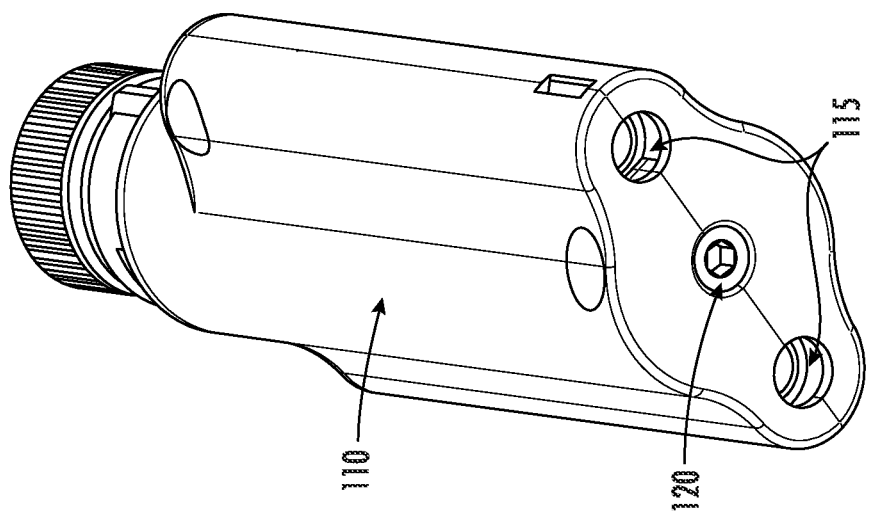
FIG. 1B is a perspective view of the primary device showing in accordance with some embodiments of the present inventive concept.
Figure 1A:
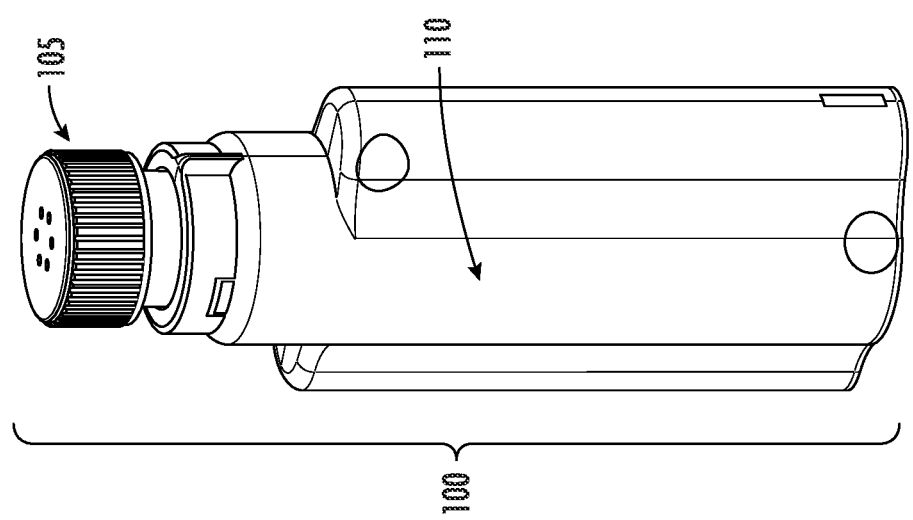
FIG. 1A is a diagram illustrating a primary device in accordance with some embodiments of the present inventive concept.
Figure 2B:
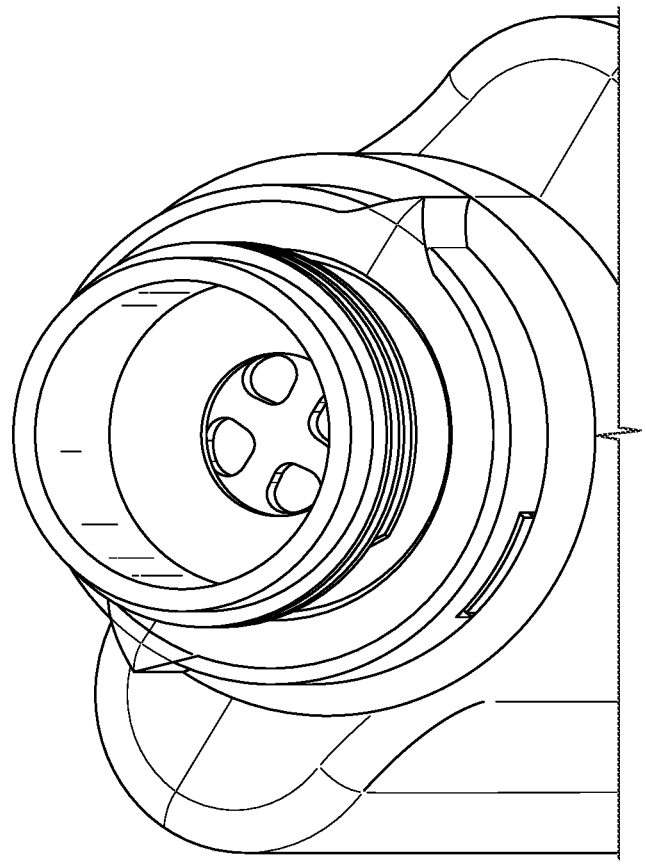
FIG. 2B is a top down views of the chamber of the primary device in accordance with some embodiments of the present inventive concept.
Figure 2A:
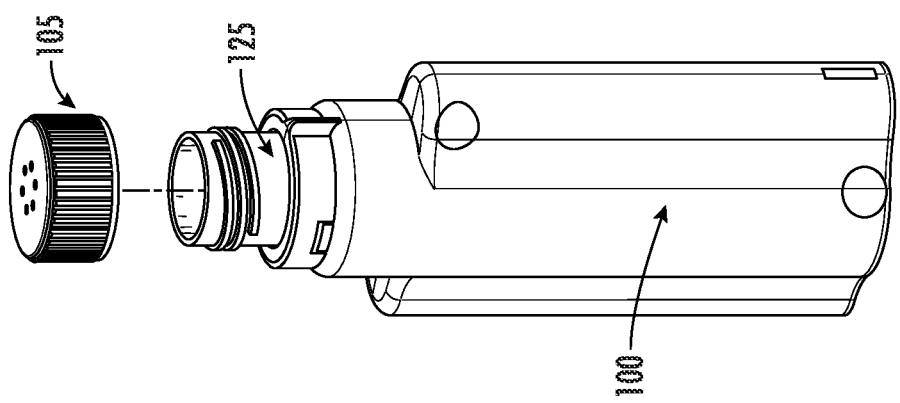
FIG. 2A is a diagram illustrating a primary device having a cap removed from the chamber in accordance with some embodiments of the present inventive concept.

Referring first to FIGS. 1A through 1C, a system including a primary device and secondary device in accordance with some embodiments will be discussed. As illustrated in FIGS. 1A and 1B, the primary device 100 includes a cap 105, a shell 110, a plurality of liquid reservoir ports 115 and a second liquid reservoir screw 120. As is clear in FIG. 1B, the shell 110 has two halves that fit together. As further illustrated, the system in FIGS. 1A through 1C is split into a primary device 100 (FIGS. 1A and 1B) and a secondary device 200 (FIG. 1C). The primary device 100 (FIGS. 1A and 1B) further includes a chamber (FIGS. 2A and 2B), a primary liquid reservoir (FIGS. 3A and 3B), and a secondary liquid reservoir (FIG. 3A and FIG. 4A) as will be discussed further below. FIGS. 2A and 2B show the removable cap 105 having been removed to illustrate details of a chamber 125 within the primary device 100. FIG. 2B illustrates a top down view into the chamber. Although the cap 105 is shown as a twist on cap, embodiments of the present inventive concept are not limited to this configuration. Other types of caps may be used without departing from the scope of the present inventive concept.

Figure 3C:
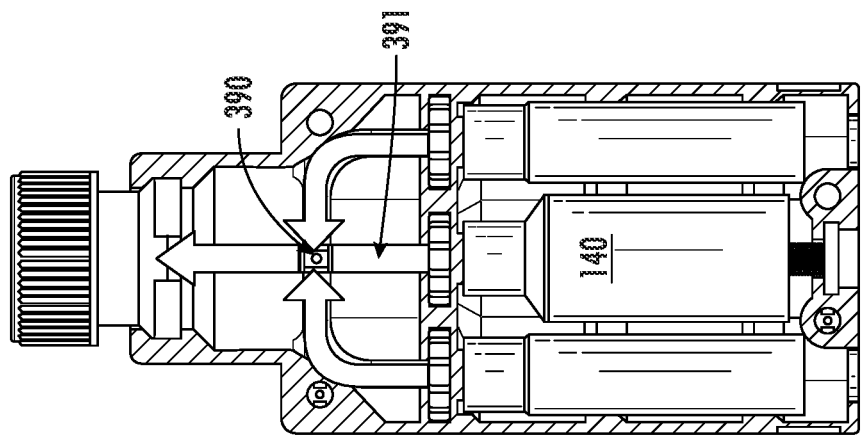
FIG. 3C is a cut away cross section of the primary device illustrating a path of liquid from the primary liquid reservoirs to a chamber in accordance with some embodiments of the present inventive concept.
Figure 3B:
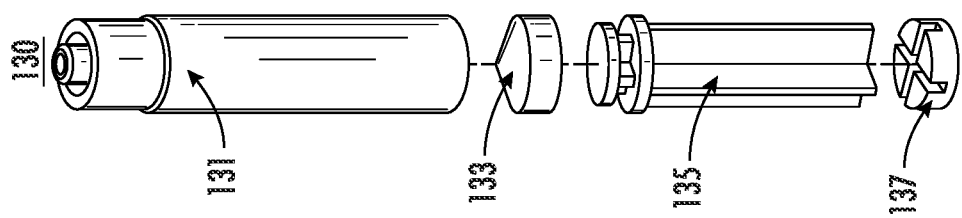
FIG. 3B is an exploded view of a primary liquid reservoir in accordance with some embodiments of the present inventive concept.
Figure 3A:
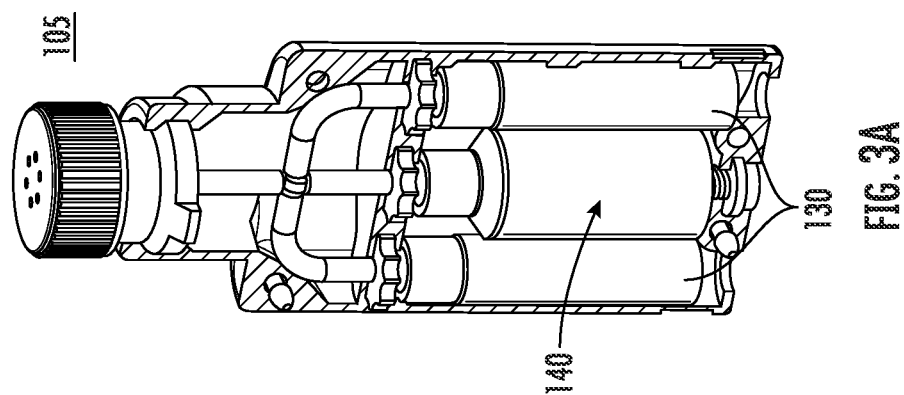
FIG. 3A is a cut away cross section of the primary device illustrating the primary and secondary liquid reservoirs illustrated therein in accordance with some embodiments of the present inventive concept.

FIGS. 3A through 3C are diagrams illustrating details of the primary device 100 and the reservoirs therein. As illustrated in FIG. 3A, the primary device 100 includes two primary liquid reservoirs 130 and a secondary liquid reservoir 140. A detailed exploded view of a primary liquid reservoir 130 in accordance with some embodiments is illustrated in FIG. 3B. As shown, the primary liquid reservoirs 130 include a primary liquid reservoir body 131, a primary liquid reservoir plunger 135, a primary liquid reservoir plunger cap 137, and a primary liquid reservoir plunger rubber tip 133. FIG. 3C illustrates a path of liquid from the primary liquid reservoirs 130 to the chamber 125 in accordance with some embodiments.

The details of the secondary liquid reservoir 140 are illustrated in FIG. 4A. As illustrated in FIG. 4A, in some embodiments, the secondary liquid reservoir 140 includes a secondary liquid reservoir body 141, secondary liquid reservoir plunger 145, a secondary liquid reservoir plunger rubber tip 143, a secondary liquid reservoir nut 147, and secondary liquid reservoir screw 149. As illustrated in FIG. 4B, the secondary liquid reservoir is positioned between the two primary liquid reservoirs 130 and are held in place by the secondary liquid reservoir screw 149.

Figure 5A:
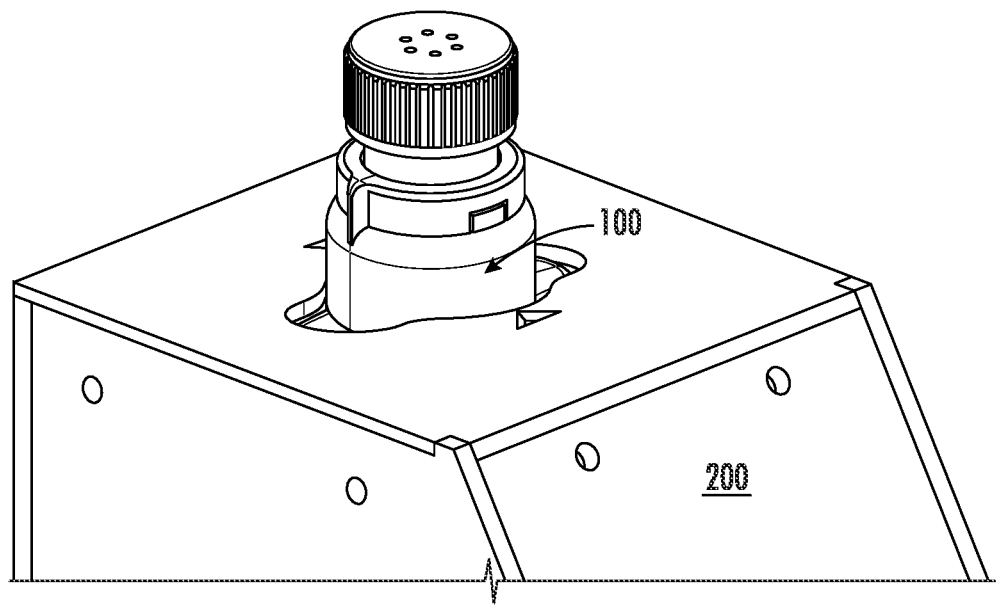
FIG. 5A is a diagram illustrating a primary device positioned in a secondary device in accordance with some embodiments of the present inventive concept.
Figure 5B:
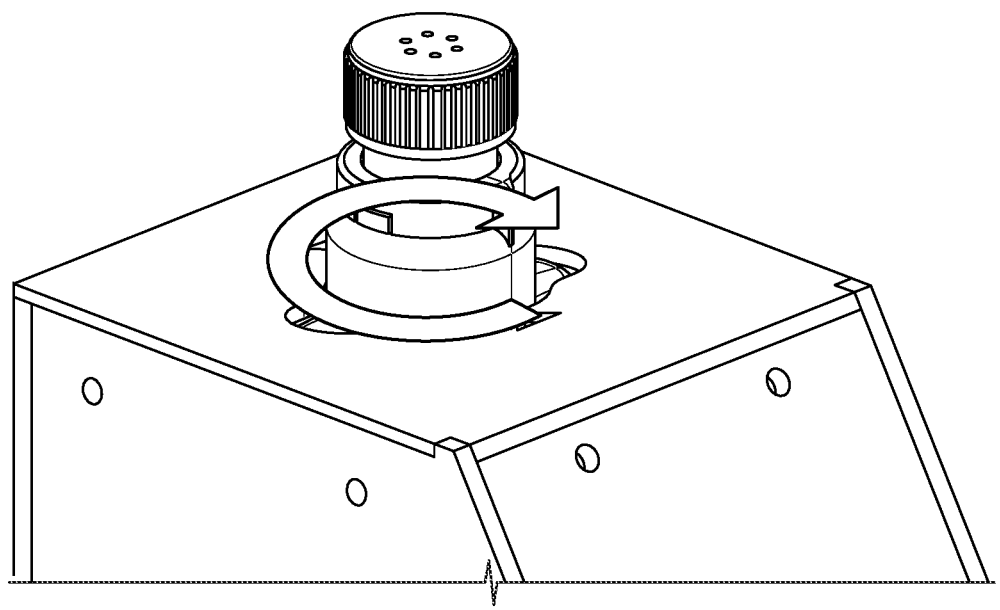
FIG. 5B is a diagram illustrating a locking mechanism for locking the primary device into the secondary device in accordance with some embodiments of the present inventive concept.

As illustrated in FIGS. 5A and 5B, the primary device 100 is positioned in the secondary device 200. In some embodiments, the secondary device 200 (FIGS. 1C, FIGS. 5A and 5B) includes a liquid delivery mechanism and a liquid removal mechanism as will be discussed further below. In some embodiments, the primary and secondary devices illustrated in FIGS. 1A through 5B may be used to deliver liquid to a chamber. In some embodiments, the liquid may contain a stain. In some embodiments the primary and secondary devices may be used to deliver a liquid to a biological sample or biopsy.

As used herein, a "biopsy" refers to an examination of tissue or cells removed from a living body to discover the presence, cause, or extent of a disease. The tissue or cells may be human or animal tissue without departing from the scope of the present inventive concept. For the purposes discussed herein, biopsies may be used for a specific patient case as well as research without departing from the scope of the present inventive concept. Furthermore, "biopsies" as used herein is intended to include any biological material for staining in accordance with embodiments discussed herein. Thus, even biological material not obtained in an official "biopsy" is intended to be included in the term "biopsy."

In operation in accordance with some embodiments, a user places the primary device 100 into the secondary device 200 (FIG. 5A) and the primary device 100 is twisted to lock it in place (FIG. 5B). As illustrated in FIG. 5B, the primary device 100 may be twisted 90 degrees in some embodiments. In some embodiments, the secondary device 200 may further include a sensor (not shown) to detect the proper placement of the primary device 100. Thus, when the primary device 100 is properly placed, it may trigger the sensor, and the sensor may provide a signal indicating proper placement. In some embodiments, the sensor may also provide an indication of improper placement.

In some embodiments, the interaction between the primary liquid reservoir 130 and the liquid delivery mechanism is triggered by the proper placement of the primary device 100 in the secondary device 200. This interaction may cause liquid from the primary liquid reservoir 130 to be dispensed to the chamber 125. Following the liquid delivery mechanism, the liquid removal mechanism activates to move the liquid from the chamber to the secondary liquid reservoir 140.

In operation, delivering liquid to a sample in a chamber 125 may include unscrewing the cap 105 from the primary device 100 and placing the sample in the chamber 125. The cap 105 is then replaced, and the primary device 100 is placed in the secondary device 200 as shown in FIGS. 5A and 5B.

In some embodiments, the cap 105 may be configured to attach to the primary device 100 with, for example, an interference fit, screw top fit, or snap fit. In some embodiments, the cap may be vented to allow for the passage of gas but not liquid. Although the figures depict the primary device 100 being inserted into the secondary device 200 in a vertical fashion, embodiments of the present inventive concept are not limited thereto. The orientation of the chamber 125 may be such that the primary device 100 is placed into the secondary device 200 horizontally or vertically. In some embodiments, the chamber 125 may be preloaded with liquid such as phosphate buffered saline (PBS), water, or other liquid.

As discussed above, in some embodiments, the primary device 100 may be secured in the secondary device 200 by rotating the primary device 100 within the secondary device 200 (FIGS. 5A and 5B). However, it will be understood that embodiments of the present inventive concept are not limited to this configuration and that the primary device 100 may be secured in the secondary device 200 by using, for example, a push-push mechanism, interference fit, snap fit, threads, or may not be secured at all without departing from the scope of the present inventive concept.

Figure 7A:
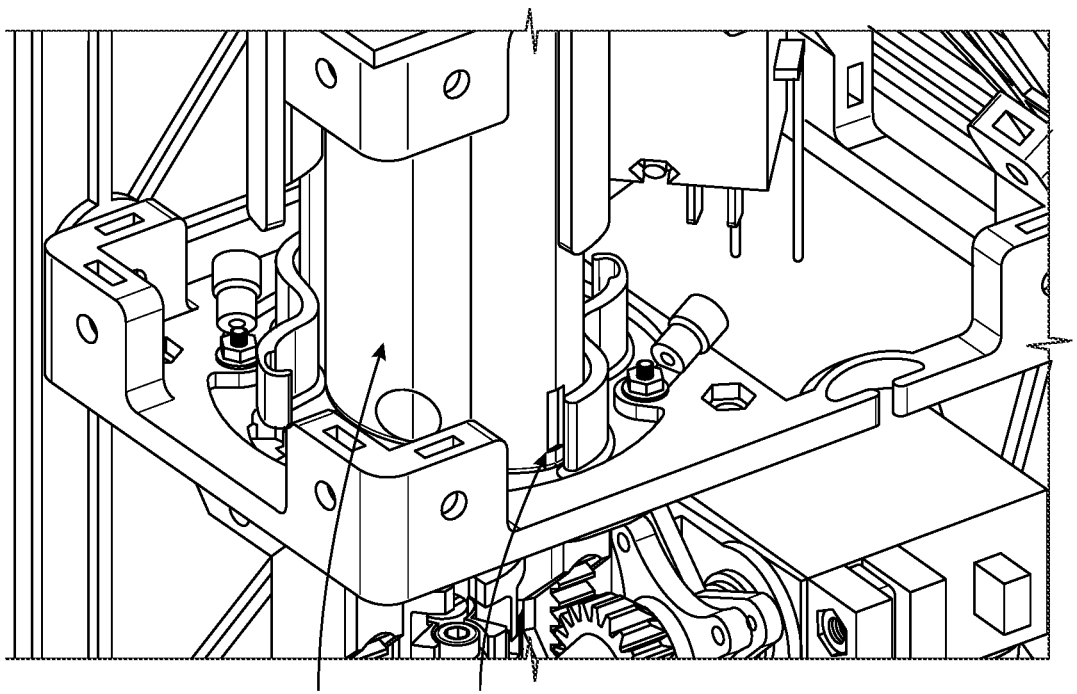
FIGS. 7A through 7B are cutaway cross sections of the secondary device illustrating various features therein in accordance with some embodiments of the present inventive concept.
Figure 7B:
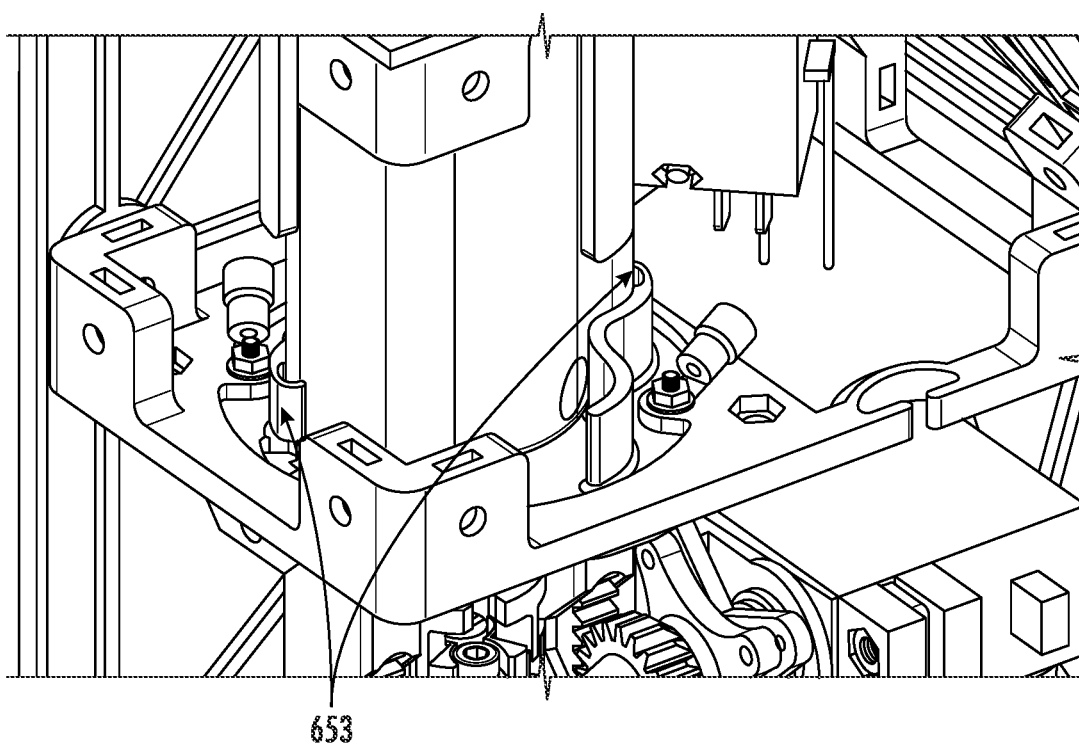

In some embodiments, the primary device 100 is locked in place by rotating it 90 degrees in the secondary device 200. As illustrated in FIGS. 6A and 6B, fins 650 in the secondary device 200 may reduce the likelihood that the primary device 100 is rotated over 90 degrees by the user. A pair of flexible tabs 653 in the secondary device 200 may provide haptic feedback to the user when the primary device 100 is rotated 90 degrees (FIG. 6B and FIG. 7B). These flexible tabs 653 interact with two divots 655 on the shell of the primary device 100 (FIG. 7A). When the primary device 100 is properly positioned in the secondary device 200 and rotated, the shell 110 of the primary device pushes on the tabs 653. The tabs 653 snap into the divots 655 on the shell when the primary device has been rotated 90 degrees, locking the primary device 100 in place (FIG. 7B). In some embodiments, the flexible tabs 653 that are used to lock the primary device in place may be spring loaded. In further embodiments, the flexible tabs 563 may be designed into the shell 110 of the primary device 100 rather than the secondary device 200. Thus, embodiments illustrated in FIGS. 6A through 7B are provided as an example only and embodiments of the present inventive concept are not limited thereto.

As discussed above, in some embodiments, the proper placement of the primary 100 device within the secondary device 200 is detected by a sensor. In some embodiments, this sensor may be a limit switch 657 (FIG. 6A). When the primary device 100 is rotated, the shell 110 of the primary device 100 contacts the arm of the limit switch 657 and depresses it. It will be understood that embodiments of the present inventive concept are not limited to the use of a limit switch 657. For example, in some embodiments, the detection of the proper placement of the primary device 100 may be performed by, for example, a hall effect sensor, a photoresistor, an infrared beam sensor and the like without departing from the scope of the present inventive concept.

In some embodiments, the detection of the proper placement of the primary device 100 may occur prior to it being locked in place. In these embodiments, the detection of the primary device 100 in the secondary device 200 may trigger a mechanism which locks the primary device 100 in place without further user input, such as a clamp that closes around the primary device 100 once inserted into the secondary device 200. In some embodiments, there may be a mechanism to alert the user of improper placement of the primary device 100 in the secondary device 200.

Figure 8B:
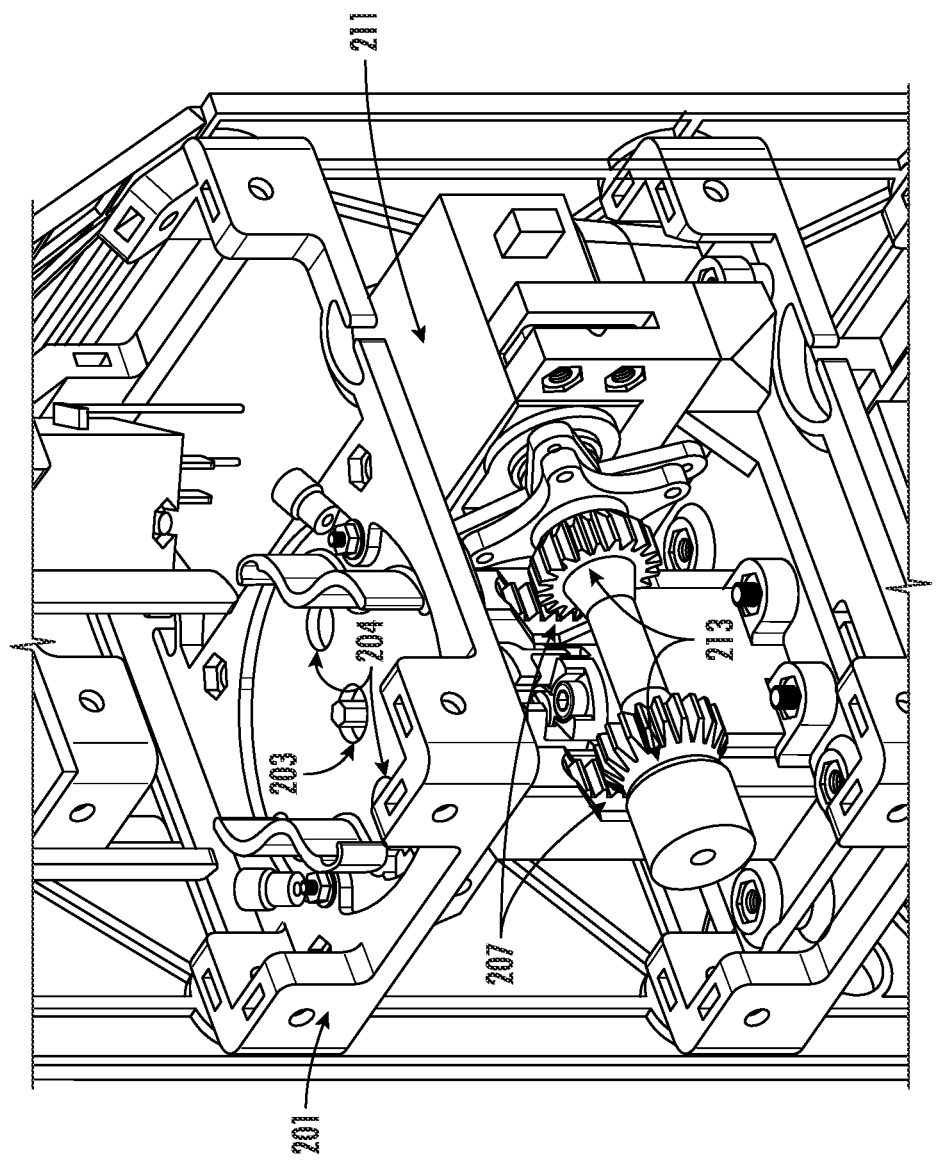
FIGS. 8A and 8B are cutaway cross sections of the secondary device illustrating various features therein in accordance with some embodiments of the present inventive concept.
Figure 8A:
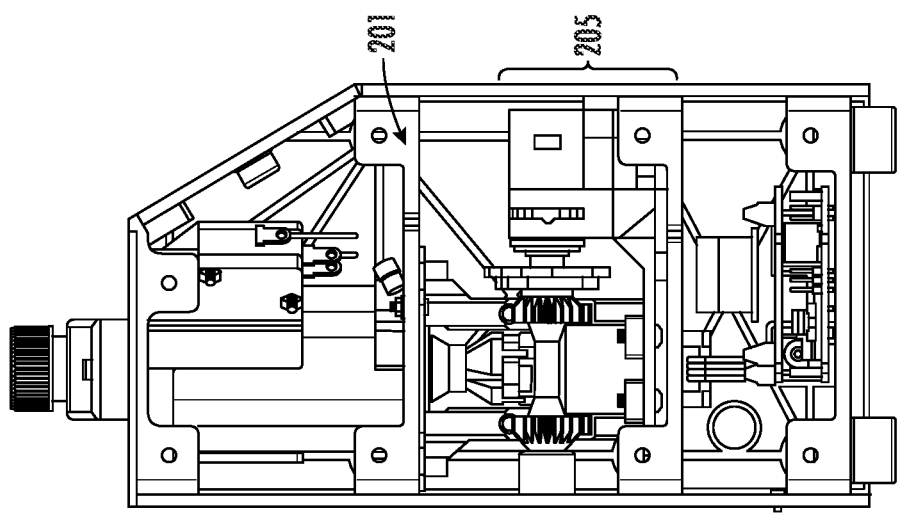

In some embodiments, the secondary device 200 may include a platform 201 which helps position the primary device within the secondary device as shown in FIGS. 8A and 8B. As illustrated, the liquid delivery mechanism 205 and the liquid removal mechanism 203 interact with the primary 130 and secondary 140 liquid reservoirs via the holes in this platform 201 (FIG. 8A). When the primary device 100 is properly placed in the secondary device 200 the holes 204 for the liquid delivery mechanism 205 line up with the primary liquid reservoirs 130, and the hole 203 for the liquid removal mechanism lines up with the secondary liquid reservoir 140.

Some embodiments of the present inventive concept include two primary liquid reservoirs 130 and one secondary liquid reservoir 140 as discussed above, for example, with respect to FIG. 3A. In some embodiments, the number of liquids to be delivered may be greater or fewer than two, which may change the geometry of the primary device 100 and the secondary device 200. In some embodiments, the primary 130 and secondary 140 liquid reservoirs may be one combined reservoir. In these embodiments, the liquid delivery mechanism 205 and the liquid removal mechanism 203 may be combined. Thus, although embodiments discussed herein have two primary reservoirs 130 and one secondary reservoir 140, it will be understood that embodiments of the present inventive concept are not limited to this configuration.

In some embodiments, the liquid delivery mechanism 205 may include a rack-and-pinion mechanism. The racks 207 may be concentric to holes in the secondary device platform. In these embodiments, the racks may be meshed with pinion gears 213 which are attached to the shaft of a rotational mechanism (FIG. 8B). In some embodiments, the rotational mechanism may be a servo motor 211, stepper motor, or DC motor. Thus, although embodiments discussed herein use a servo motor 211 to turn the pinion gears 213, it will be understood that embodiments of the present inventive concept are not limited to this configuration.

Figure 9B:
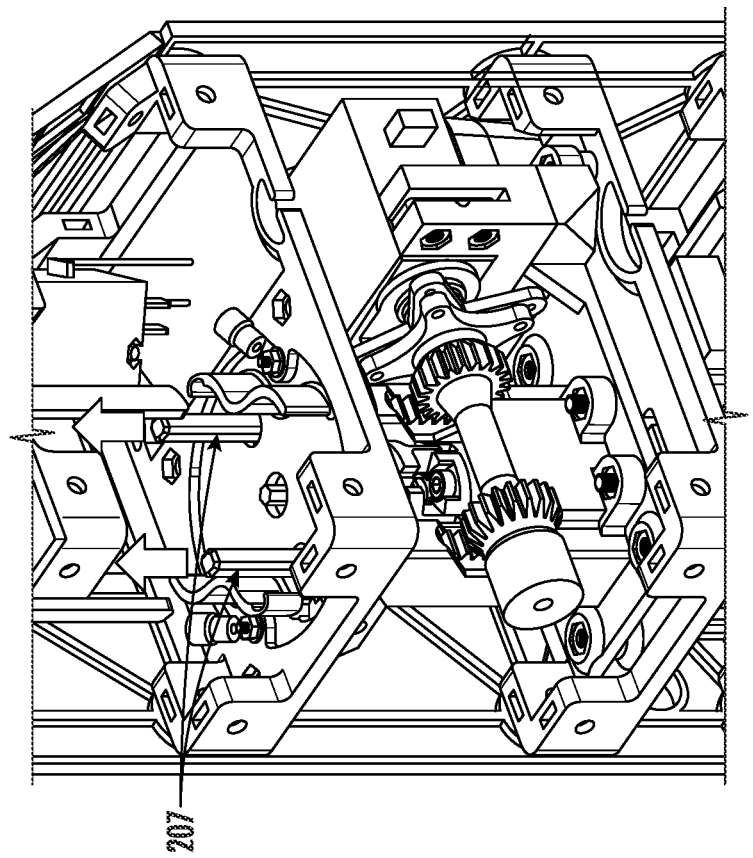
FIGS. 9A and 9B are cutaway cross sections of the secondary device illustrating positioning of the primary device into the secondary device in accordance with some embodiments of the present inventive concept.
Figure 9A:
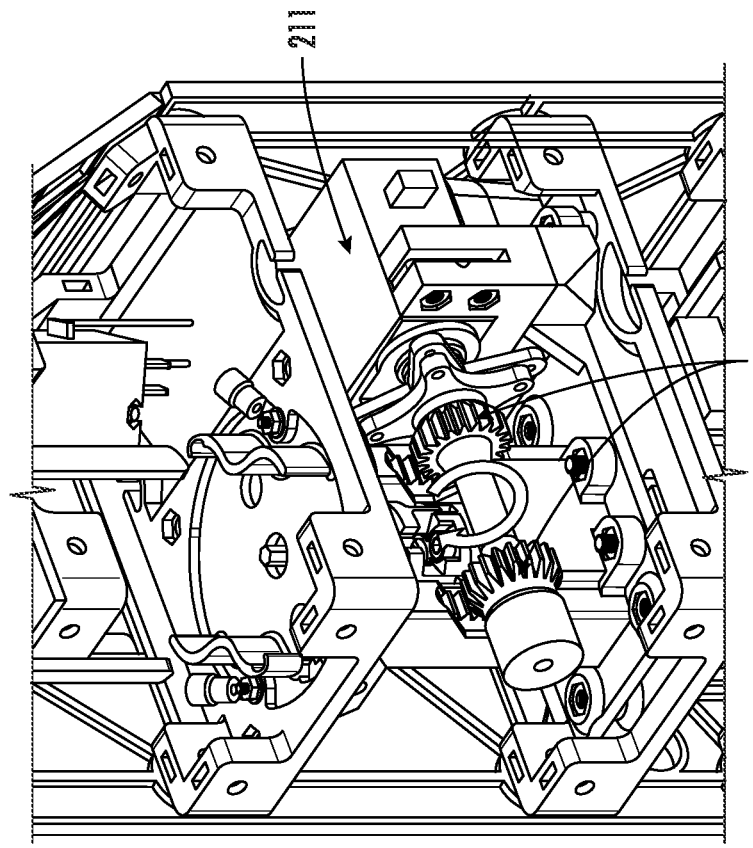
Figure 10A:
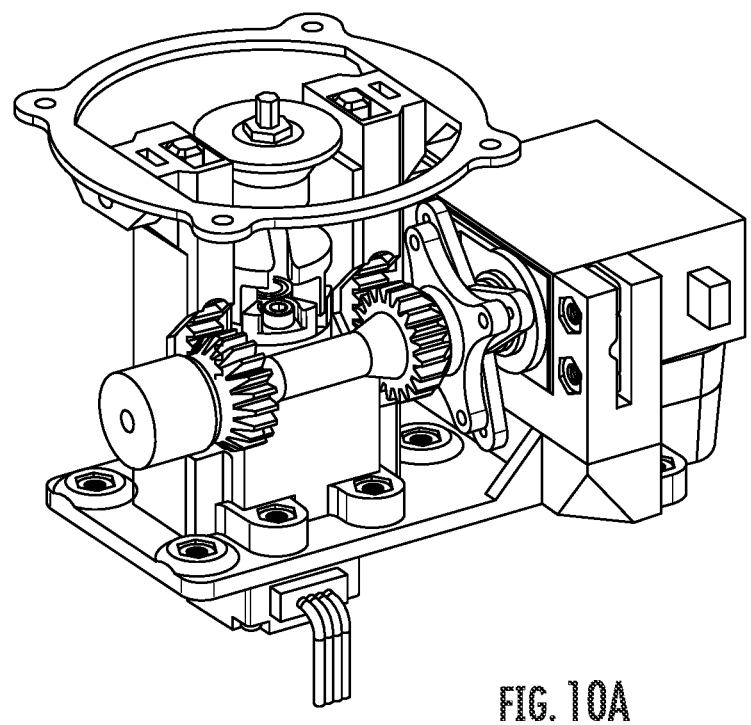
FIGS. 10A and 10B are cutaway cross sections of the secondary device illustrating the stain delivery mechanism in accordance with some embodiments of the present inventive concept.
Figure 10B:
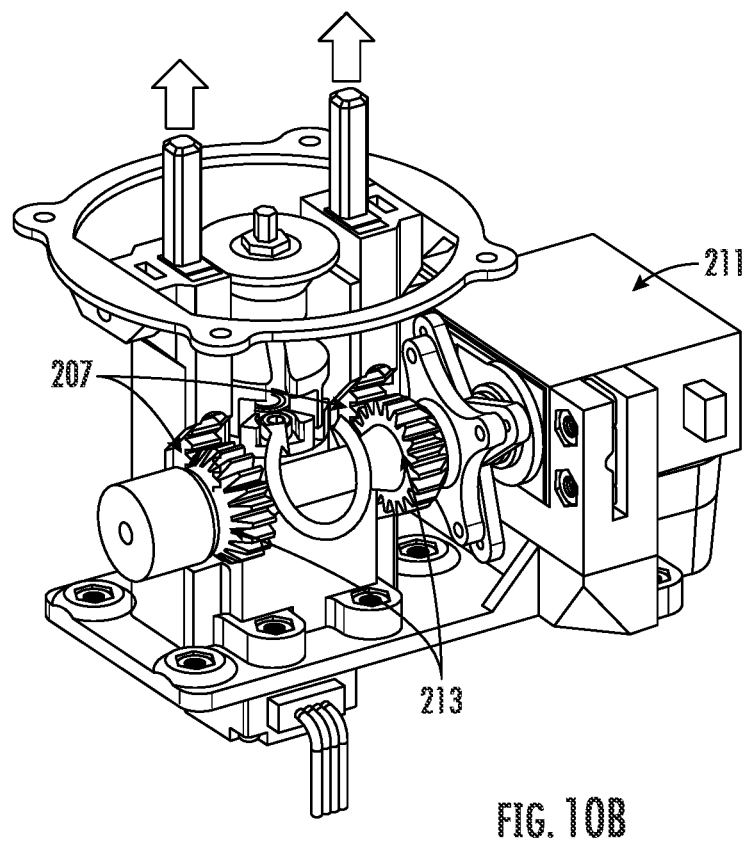

In some embodiments, upon the sensing the proper placement of the primary device 100 into the secondary device 200, the servo motor 211 responsible for rotating the pinion gears 213 begins to spin (FIG. 9A). When the pinion gears 213 spin, the racks 207 are driven upward through the secondary device platform holes and into the primary device (FIG. 9B), which has corresponding holes on the bottom face that contacts the platform (FIGS. 9A through 10B). In particular as illustrated in FIGS. 10A and 10B, the pinion gears 213 spun by the servo motor 211 push up the rack gears 207 into the primary device (not shown). The rack gears 207 push on the plungers of the primary liquid reservoirs which dispenses the liquid therein into the chamber. The primary liquid reservoirs 130 are positioned inside the primary device 100 and are also concentric to these holes.

Figure 11A:
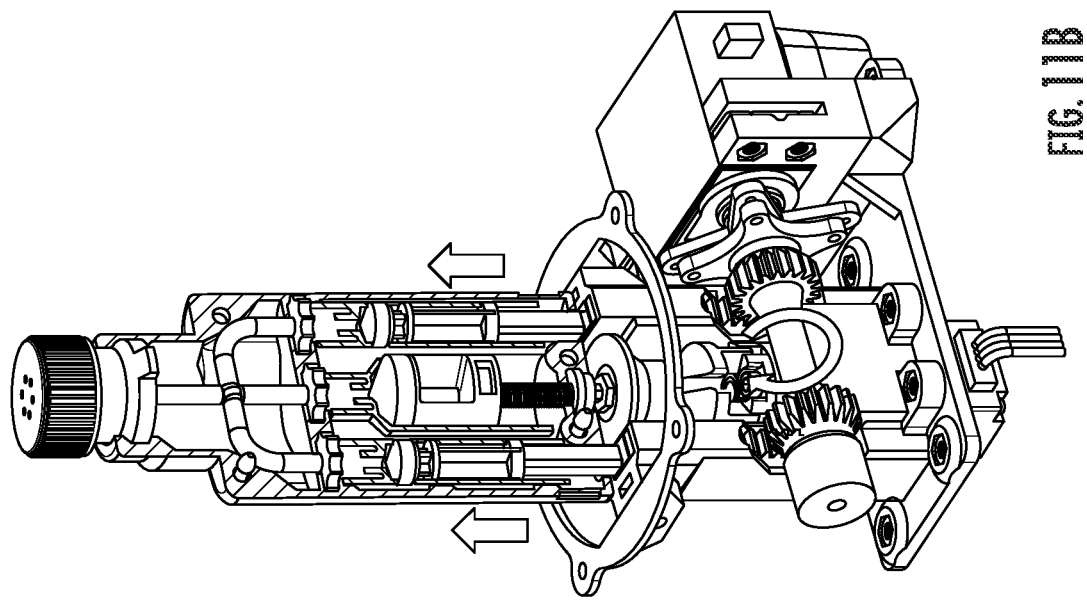
FIGS. 11A and 11B are cutaway cross sections of the primary device illustrating the stain delivery mechanism in accordance with some embodiments of the present inventive concept.
Figure 11B:
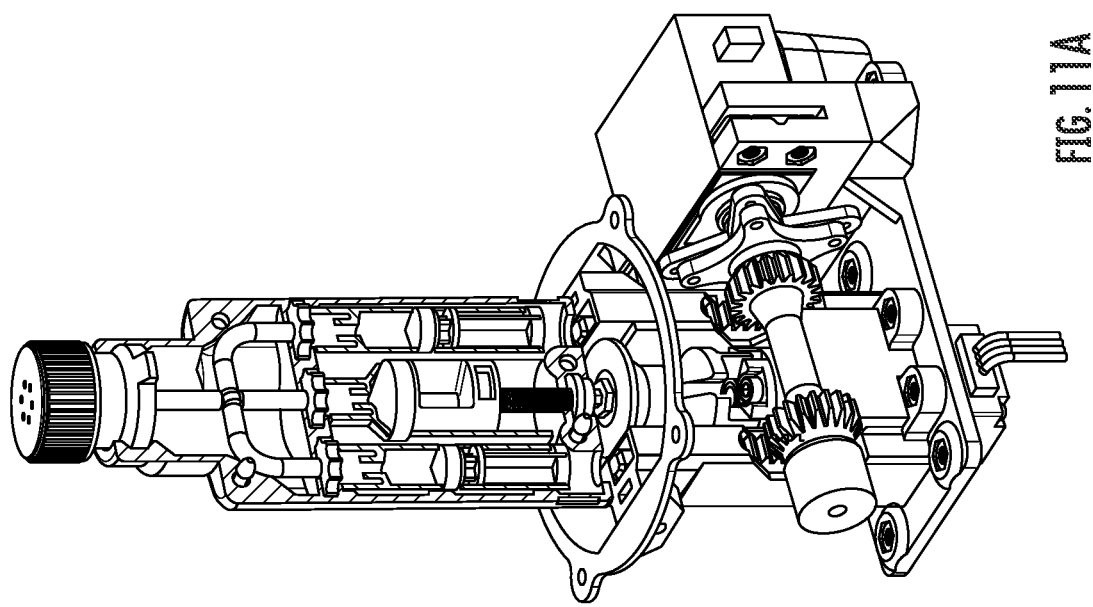
Figure 12C:
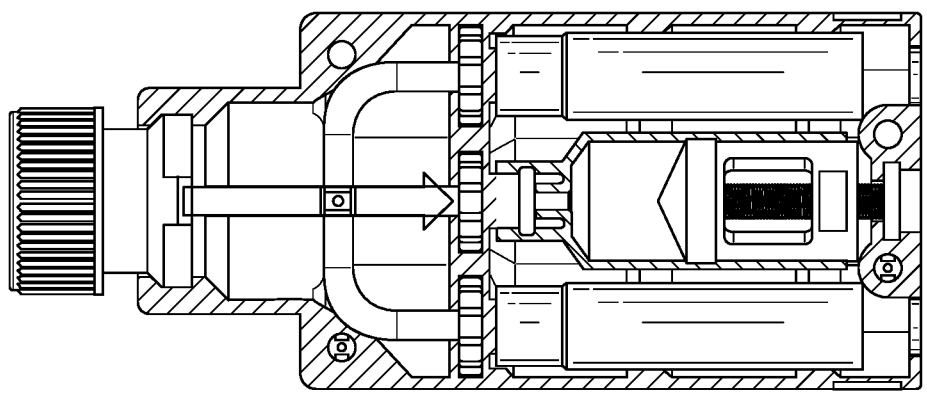
FIGS. 12A through 12C are cutaway cross sections of the primary device illustrating the liquid removal in accordance with some embodiments of the present inventive concept.
Figure 12B:
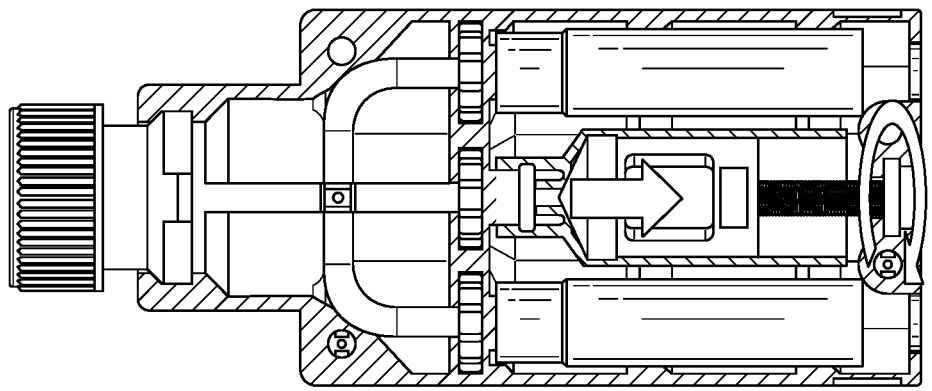
Figure 12A:
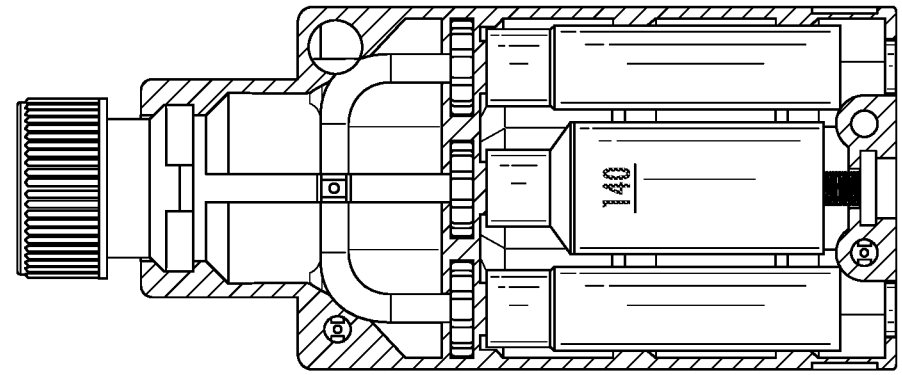

In some embodiments, as discussed above, the primary liquid reservoirs 130 include a primary liquid reservoir body 131, a primary liquid reservoir plunger 135, a primary liquid reservoir plunger cap 105, and a primary liquid reservoir plunger rubber tip 133 (FIG. 3B). When filled with liquid, the primary liquid reservoir plunger cap 137 sits substantially flush with the bottom of the primary liquid reservoir body 131. When the racks are driven through the secondary device platform holes and into the holes in the bottom of the primary device, they contact the bottom of the primary liquid reservoir plunger cap 137. As the rotational mechanism continues to drive the racks upward, the primary liquid reservoir plunger 135 is pushed further into the primary liquid reservoir body as shown in FIGS. 11A and 11B. This action forces the liquid out of the primary liquid reservoirs 130 and into the chamber 125 using a path shown, for example, in FIG. 3C.

In some embodiments, as discussed above, the mechanism that transmits force to the primary liquid reservoirs may be produced by a linear servo motor 211, a stepper motor 1380, a lead screw and captive nut mechanism, or belt driven mechanism. In further embodiments, the action of placing the primary device 100 into the secondary device 200 may cause the expulsion of liquid from the primary liquid reservoirs. In these embodiments, there may be a fixed mechanism in the secondary device that interacts with the primary liquid reservoir and pushes the primary liquid reservoir plungers as the user pushes the primary device into the secondary device. In still further embodiments, the liquid may be held in a "blister pack" or other flexible container which is depressed by some mechanism to dispense the liquid. In some embodiments, the user may manually dispense the liquid from the primary liquid reservoirs into the chamber. In further embodiments, the liquids may be delivered to the chamber one at a time rather than together. In still further embodiments, the entire liquid delivery mechanism may be internal to the primary device, rather than external. For example, the rack-and-pinion mechanism discussed above may be inside the primary device but driven by an external force from the secondary device. Thus, although embodiments discussed herein use a rack-and-pinion mechanism to transmit force to the primary liquid reservoirs, it will be understood that embodiments of the present inventive concept are not limited to this configuration.

In some embodiments, liquid from the primary liquid reservoirs flows through the tubes that connect the primary liquid reservoirs to the barbed cross connector 390, then upward towards the chamber as shown in FIG. 3C. The bottom of the barbed cross connector 390 is connected to a tube 391 that leads to the secondary liquid reservoir 140. The liquid from the primary liquid reservoirs is unable to travel through this tube at this time because the secondary liquid reservoir is being held closed by the liquid removal mechanism, as will be discussed further herein. In some embodiments, the primary and secondary liquid reservoirs may use separate tube connections to the chamber. In further embodiments, the liquids may lead to the chamber directly rather than combining at the barbed cross connector. Thus, although embodiments discussed herein use a barbed cross connector 390 to combine the three tubes before leading to the chamber, it will be understood that embodiments of the present inventive concept are not limited to this configuration.

In some embodiments, the chamber includes a chamber outlet. Liquid may enter or exit the chamber via the outlet. The outlet may be covered by a grate or mesh (FIG. 2B) which does not impede the liquid delivery to, or removal from, the chamber but may prevent objects larger than the pores of the grate or mesh from exiting the chamber via the outlet. In some embodiments, if a vented cap is used to seal the chamber, gas may be pushed through the vents of the cap as liquid is delivered to the chamber. Providing the vented cap may equalize pressure within the chamber, making it easier to continue to push liquid from the primary liquid reservoirs into the chamber. In some embodiments the vents may be in places other than the cap, such as the sides of the chamber. In some embodiments, the chamber may be mechanically agitated while filled with liquid. In these embodiments, the agitation may be accomplished using, for example, a vibrating motor disk.

In some embodiments, the primary device may have threads on the shell that interact with corresponding threads on the secondary device. In these embodiments, the user may thread the primary device into the secondary device. This action may cause an interaction between the primary liquid reservoir and some liquid delivery mechanism within the secondary device. This mechanism would also serve to lock the primary device into the secondary device.

In some embodiments, the liquid/stain removal mechanism 1301 may include a stepper motor 1380, a driver bit 1383, and the secondary liquid reservoir 140 (FIGS. 12A through 13B). The secondary liquid reservoir 140 may include the secondary liquid reservoir screw 149, the secondary liquid reservoir nut 147, the secondary liquid reservoir body 141, the secondary liquid reservoir plunger 145, and the secondary liquid reservoir plunger rubber tip 143 (FIG. 4A). When the primary device 100 is loaded into the secondary device 200, the secondary liquid reservoir plunger 145 is already fully inserted into the secondary liquid reservoir body 141, and the secondary liquid reservoir screw 149 is partially threaded into the secondary liquid reservoir nut 147 which is mated with the secondary liquid reservoir plunger 145 (FIG. 14A). The secondary liquid reservoir screw 149 is held in place axially by two semicircular grooves on the inside of the two halves of the shell of the primary device 100, but the screw 149 can rotate freely within these grooves (FIG. 4B). The socket of the secondary liquid reservoir screw faces downward and can be accessed from outside the primary device 100 (FIG. 4B).

Figure 14A:
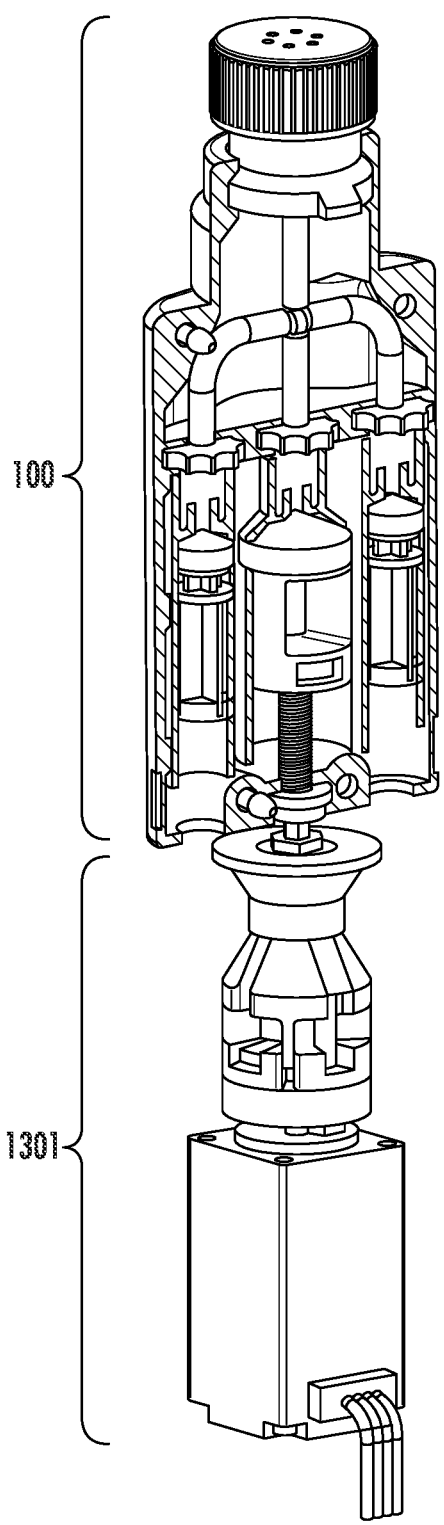
FIGS. 14A and 14B are cross sections of the primary device illustrating details of the stain removal mechanism in accordance with some embodiments of the present inventive concept.
Figure 14B:
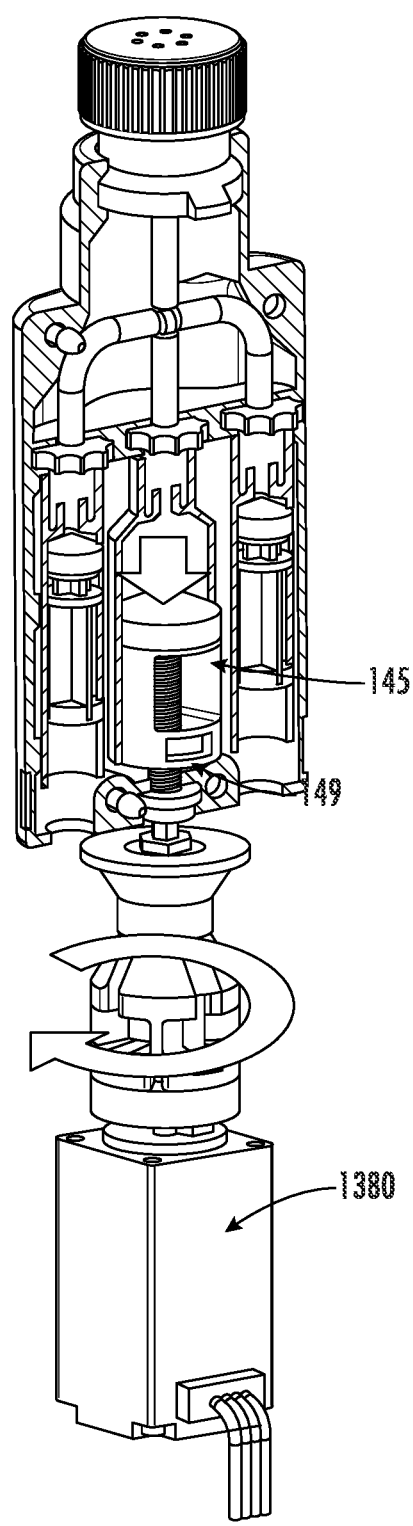

Upon proper placement of the primary device, the driver bit is seated in the socket of the secondary liquid reservoir screw 149 (FIG. 14A). When liquid is to be removed from the chamber, the stepper motor 1380 begins to spin which spins the driver bit 1383 attached to the shaft of the stepper motor 1380 (FIG. 14B). The driver bit 1383, which is seated in the socket of the secondary liquid reservoir screw 149, spins the secondary liquid reservoir screw 149. The secondary liquid reservoir nut 147 threads itself onto the secondary liquid reservoir screw 149 as the screw spins. As the nut 147 is threaded onto the screw 149, the secondary liquid reservoir plunger 145 is drawn downward in the secondary liquid reservoir body 141, creating suction. This suction draws the liquid out of the chamber via the chamber outlet and into the secondary liquid reservoir 140 (FIG. 14B). The vents in the vented cap ensure that the pressure differential inside and outside this fluid system is maintained because as the liquid is drawn out of the chamber via the outlet, gas is drawn into the chamber via the vents. This pressure equalization makes it easier to draw liquid out of the chamber and into the secondary liquid reservoir 140. When the secondary liquid reservoir plunger 145 has been fully drawn down by the secondary liquid reservoir screw 149, the racks are retracted from the primary device 100 via the reversal of the pinion gears.

Figure 13B:
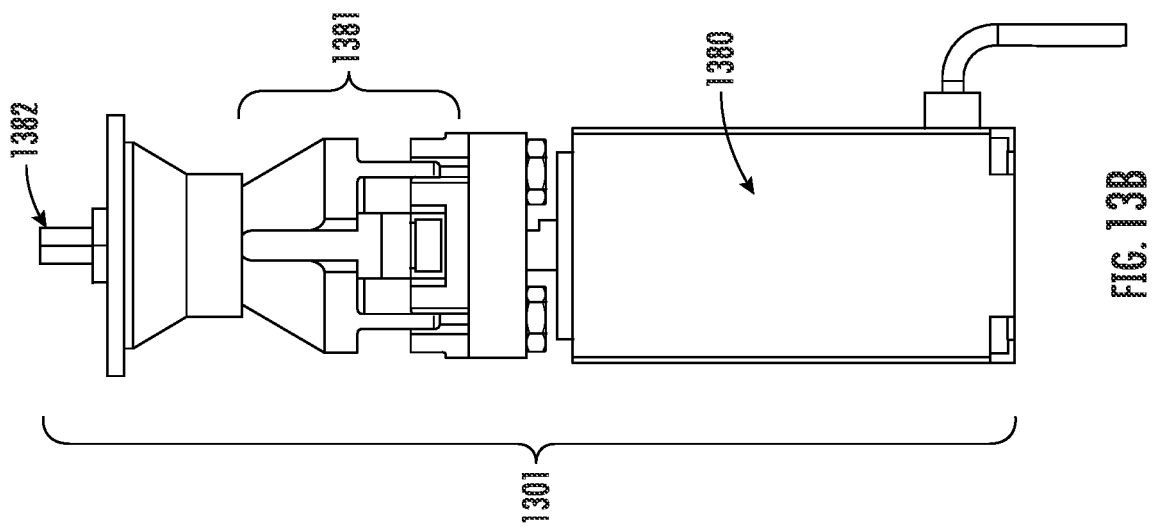
FIGS. 13A and 13B are diagrams illustrating details of the stain removal mechanism in accordance with some embodiments of the present inventive concept.
Figure 13A:
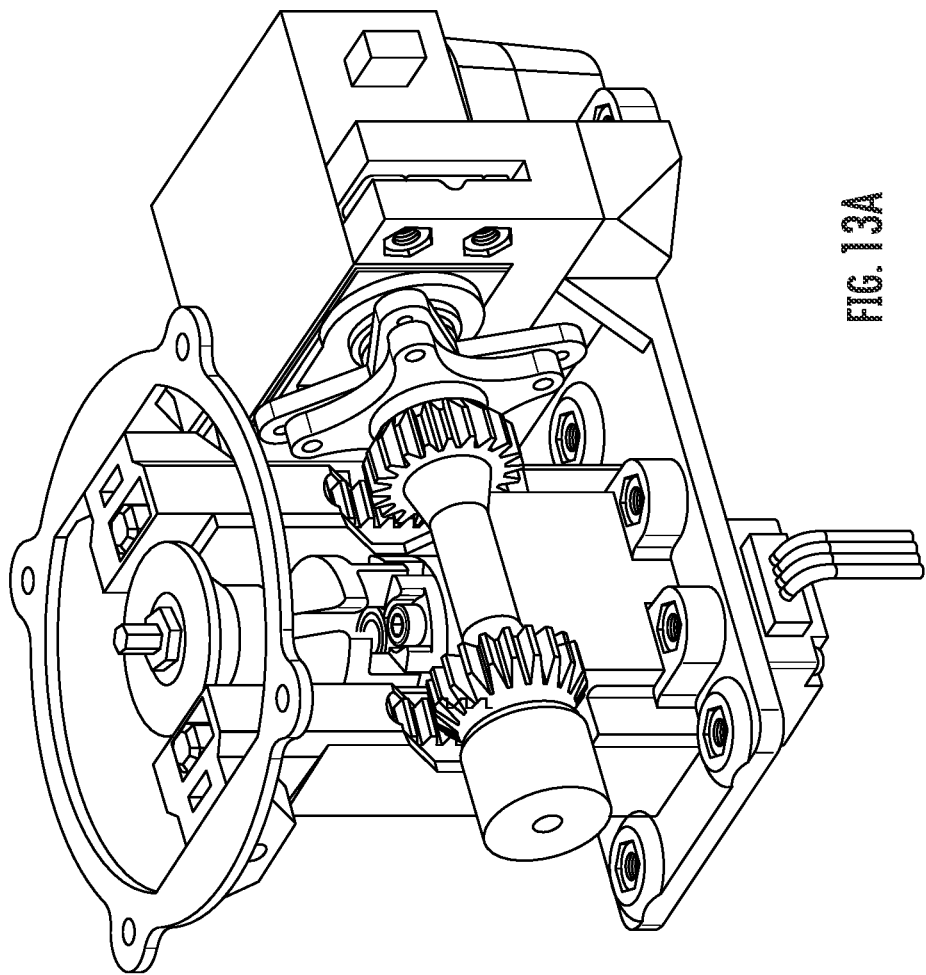

In some embodiments, the driver bit 1383 may be attached to the stepper motor 1380 via the spring chuck 1381 (FIG. 13B). The spring chuck 1381 spring loads the driver bit 1383 to ease with placement of the primary device 100 in the secondary device 200 because the spring may allow for slight misalignments at the time of insertion. The spring chuck 1381 allows the driver bit 1383 to move up and down in the axis of the secondary liquid reservoir screw 149 while still permitting the transmission of torque from the stepper motor 1380 to the driver bit 1383. As the bit spins, it may naturally seat in the drive of the screw as the force of the spring pushes the bit up. The upward spring force combined with the rotation of the bit may increase the chance of proper contact between the secondary liquid reservoir screw socket and driver bit, in some embodiments.

Figure 15B:
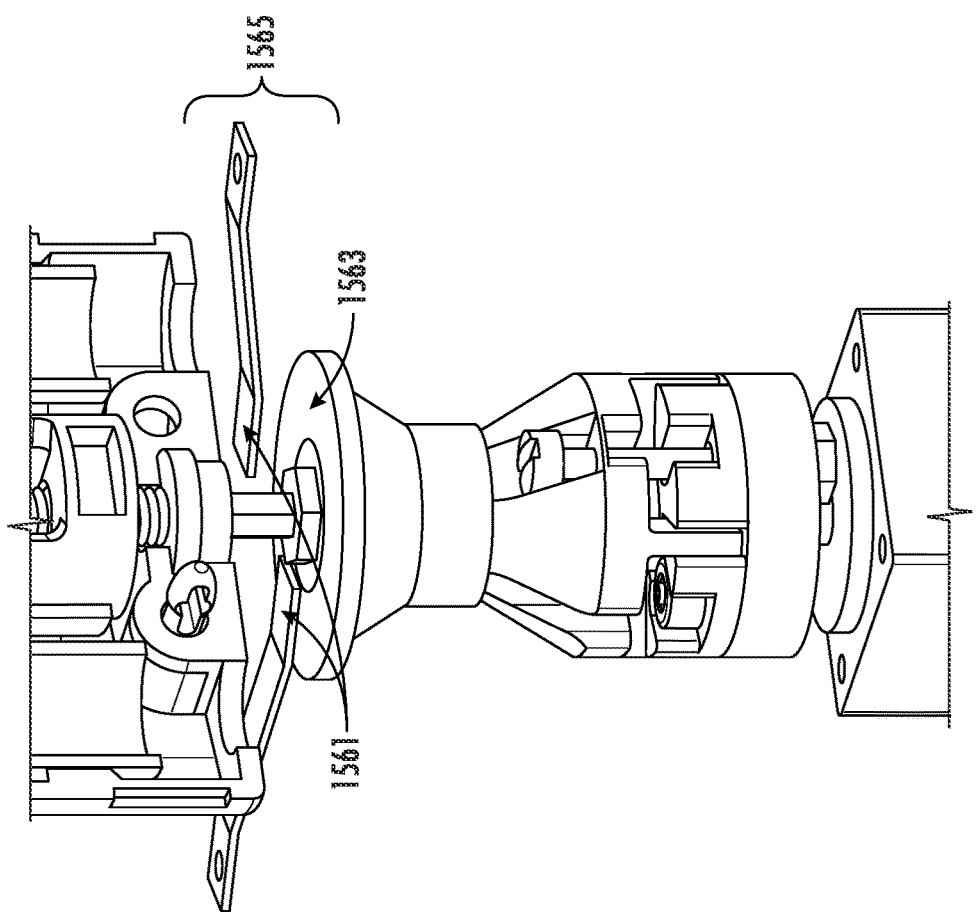
FIGS. 15A and 15B are diagrams illustrating the spring chuck mechanism and the improper placement mechanism, respectively, in accordance with some embodiments of the present inventive concept.
Figure 15A:
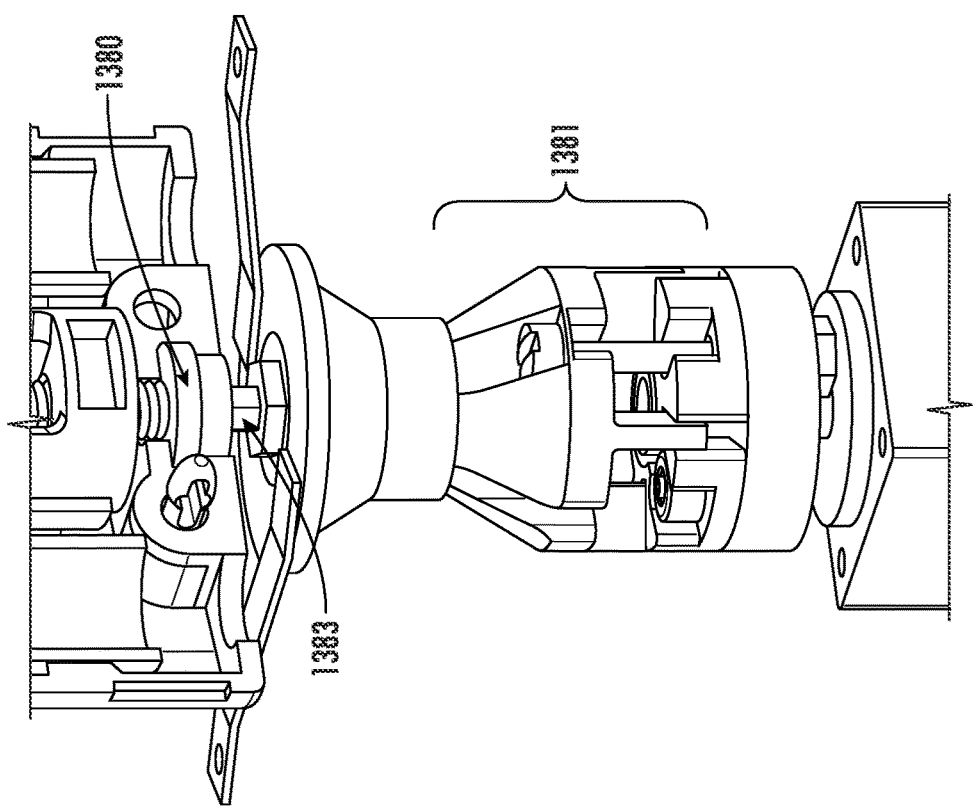

In some embodiments, the improper placement detection mechanism 1565 senses if the driver bit 1383 is not seated in the socket of the secondary liquid reservoir screw 149 (FIGS. 15A and 15B). The improper placement detection mechanism 1565 is comprised of two metal tabs 1561 attached to the bottom of the secondary device platform and a metal washer 1563 attached to the top of the spring chuck (FIGS. 15A and 15B). Each metal tab 1561 is connected to a microcontroller by a wire. When the spring chuck 1381 is not compressed, indicating proper placement of the driver bit 1383 in the socket of the secondary liquid reservoir screw 149, the washer 1563 touches both metal tabs 1561 and a circuit is completed from one pin of the microcontroller to another through the metal tabs 1561 (FIG. 15A). If there is any misalignment between the driver bit 1383 and the secondary liquid reservoir screw socket, the driver bit 1383 may not properly seat in the socket of the screw. In this instance, the spring chuck 1381 compresses, and the improper placement detection mechanism activates 1565 (FIG. 15A). When the spring chuck is compressed, the circuit made between the metal tabs 1561 and the washer 1563 is broken, which is detected by the microcontroller. The metal tabs 1561 rest on top of the metal washer 1563 and do not prohibit the spring chuck 1381 from spinning when the stepper motor 1380 is active.

In some embodiments, the secondary liquid reservoir plunger 145 may be pulled down by a servo motor 211 that connects to the secondary liquid reservoir plunger 145 when the primary device 100 is placed in the secondary device 200. In some embodiments, there may only be one reservoir which doubles as the primary and secondary liquid reservoir. In these embodiments, liquid would be dispensed from this reservoir and then drawn back into the reservoir via the same mechanism. In further embodiments, the liquid may be delivered to or removed from the chamber via suction from a pump that connects to the chamber. In still further embodiments, the liquid may not be removed from the chamber once delivered. In some embodiments, additional reservoirs may be present in the body of the primary device 100 for additional delivery of liquids to the chamber. Additional liquid deliveries or removals may be accomplished as previously described. In some embodiments, the liquids may not be housed in reservoirs in the primary device 100, but in the secondary device. In these embodiments, the primary device 100 may be loaded into the secondary device 200 where liquid delivery ports contact the primary device 100. In these embodiments, the liquids may be delivered into the chamber using any of the methods previously described here. In these embodiments, the secondary device may have sufficient liquid to be used on multiple primary devices.

Figure 16:
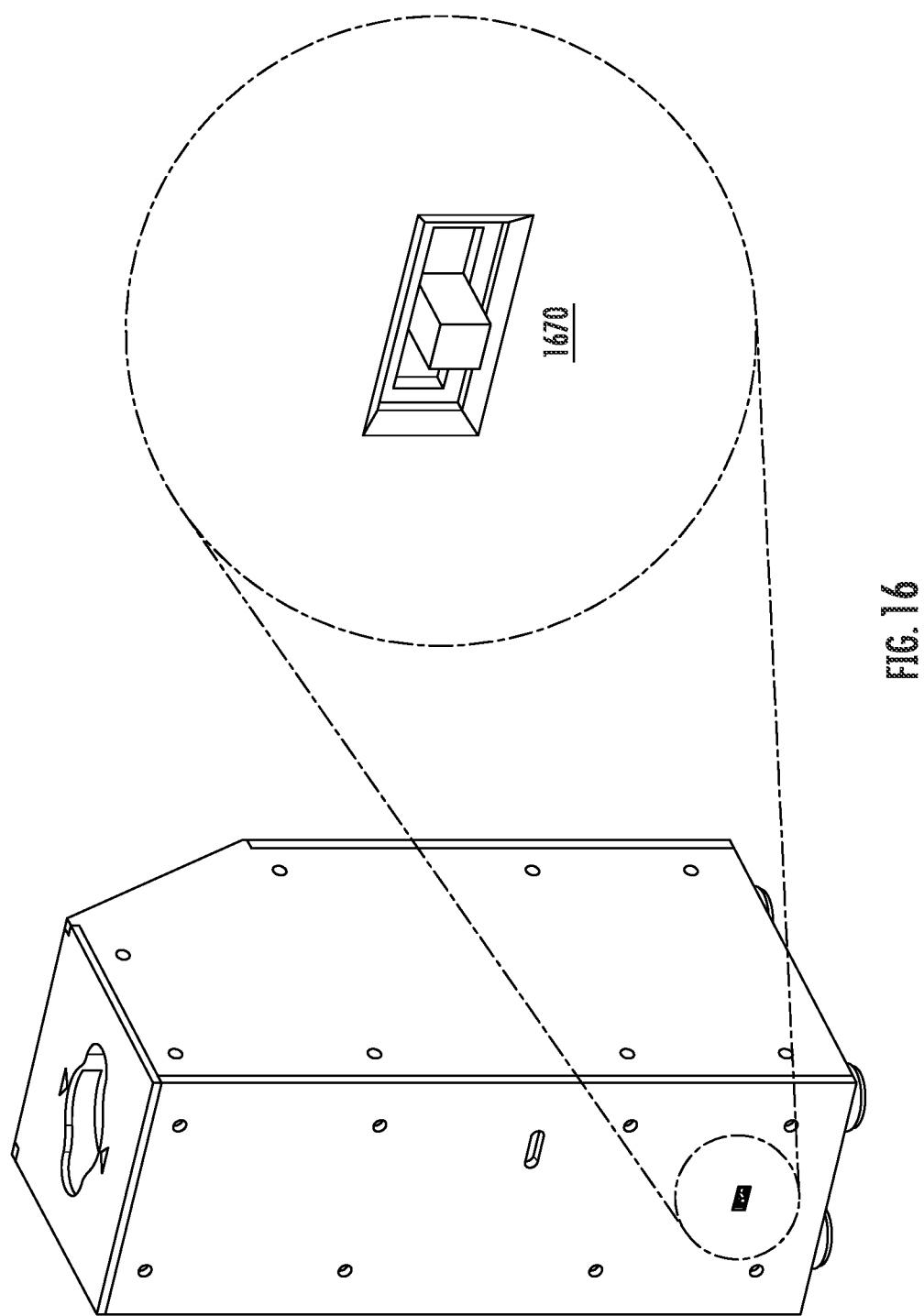
FIG. 16 is a diagram of a secondary device including a switch in accordance with some embodiments of the present inventive concept.

In some embodiments, the length of time between the liquid being delivered to the chamber by the liquid delivery mechanism and the liquid being removed from the chamber by the liquid removal mechanism can be selected via a multi-stop switch 1670 as illustrated in, for example, FIG. 16. In some embodiments, the length of time may be selected via a dial or slider connected to a potentiometer. In some embodiments, a simple light emitting diode (LED) display and buttons could be used to select the time between liquid delivery and removal. In these embodiments, the LED display may count down the seconds to liquid removal. Thus, although embodiments discussed herein use a multi-stop switch 1670 to control the length of time between liquid delivery and liquid removal, it will be understood that embodiments of the present inventive concept are not limited to this configuration.

In some embodiments, the status of the secondary unit may be shown by an indicator light. Different indicator light colors may indicate, for example, that the secondary device is ready to receive a primary device, the secondary device is waiting to remove the liquid from the chamber, or the liquid has been removed from the chamber and the primary device may be removed from the secondary device. Additionally, the status indicator light may have a color for when the primary device has not been properly placed in the secondary device. This would prompt the user to remove the primary device and try again. Some embodiments may also include a sound or alert to indicate different statuses of the primary and secondary device.

In some embodiments, the liquid to be removed from the chamber may be wicked away by an absorbent material. The absorbent material may be any material capable of performing the function without departing from the scope of the present inventive concept. In these embodiments, the liquid removal mechanism may function to introduce the absorbent material to the chamber.

In some embodiments, the liquid delivery mechanism may deliver the liquid to the chamber from the top of the chamber. In these embodiments, gravity may be used to move the liquid from the primary liquid reservoir to the chamber. Similarly, gravity may be used to move the liquid from the chamber to the secondary liquid reservoir.

In some embodiments, the primary device may be removed from the secondary device after the liquid has been removed from the chamber. In these embodiments, the primary device may need to be unlocked from the secondary device prior to removal.

In some embodiments, samples may be placed in the chamber prior to placing the primary device into the secondary device. Any samples previously placed in the chamber may be removed from the chamber by removing the cap. In embodiments where samples are placed in the chamber, the sample may not be removed from the chamber after it is exposed to the liquid. In some embodiments, the sample may be imaged using a microscope after it is exposed to the liquid. In these embodiments, part of the chamber may be made of an optically clear material such as glass or plastic. In these embodiments, the sample may be imaged by a microscope while still in the chamber. In these embodiments, the secondary device may contain the optical components of the microscope. In other embodiments, the primary device may not be removed from the secondary device before the sample is retrieved from the primary device. In these embodiments, the sample may be removed from the chamber and the primary device may remain in the secondary device. In these embodiments, the secondary device may have a mechanism to store the used primary device. In other embodiments the secondary device may be multiplexed to accommodate several primary devices at once.

In some embodiments, the coordination of the liquid removal mechanism, liquid delivery mechanism, and various sensors is coordinated by a microcontroller in the secondary device. In some embodiments, the secondary device may be controlled by a computer. In these embodiments, the secondary device may be attached to the computer via universal serial bus (USB).

Although embodiments discussed above with respect to FIGS. 1 through 16 have been illustrated as being a two-part system including primary and secondary devices, it will be understood that the elements that more than two components may be present in these systems. In other words, the primary and secondary devices may be further broken into one or more additional subsystems. In some instances, it may be advantageous to do so. For example, when multiple samples need to be exposed to the same liquid or combination of liquids. In the embodiments discussed above, multiple samples would require multiple primary devices, each of which contain primary and secondary reservoirs. If, however, the primary and secondary reservoirs were large enough, one device may be used on all samples. Such an embodiment may be broken down into primary, secondary, and tertiary devices. The primary device may include a sample chamber, the secondary device may include any number of reservoirs, and the tertiary device may include the components required to move liquid between the reservoirs and chamber.

Figure 18B:
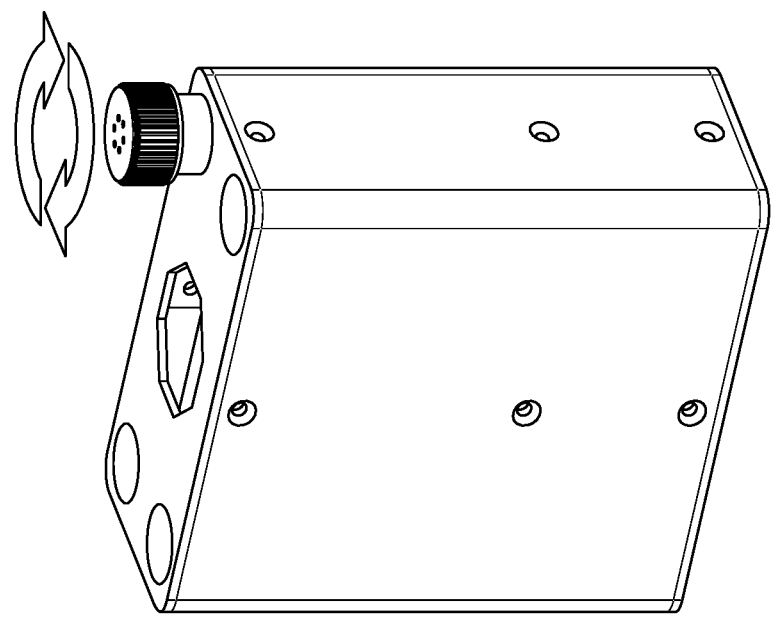
FIGS. 18A and 18B are diagrams illustrating insertion of reservoirs into a secondary device in accordance with some embodiments of the present inventive concept.
Figure 18A:
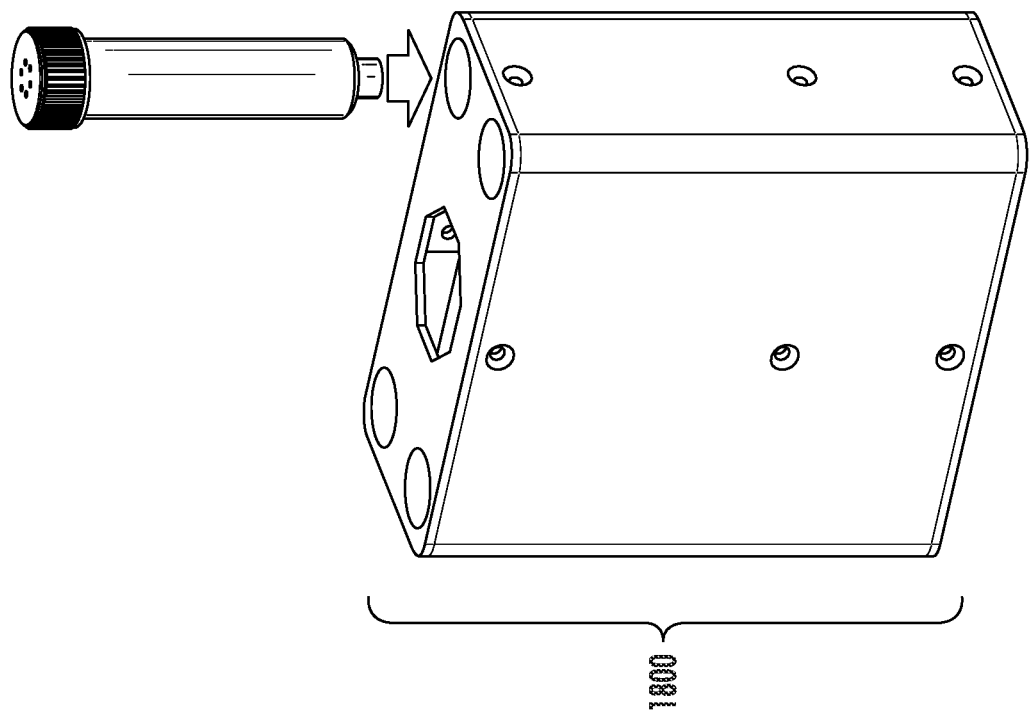
Figures 19A, 19B:
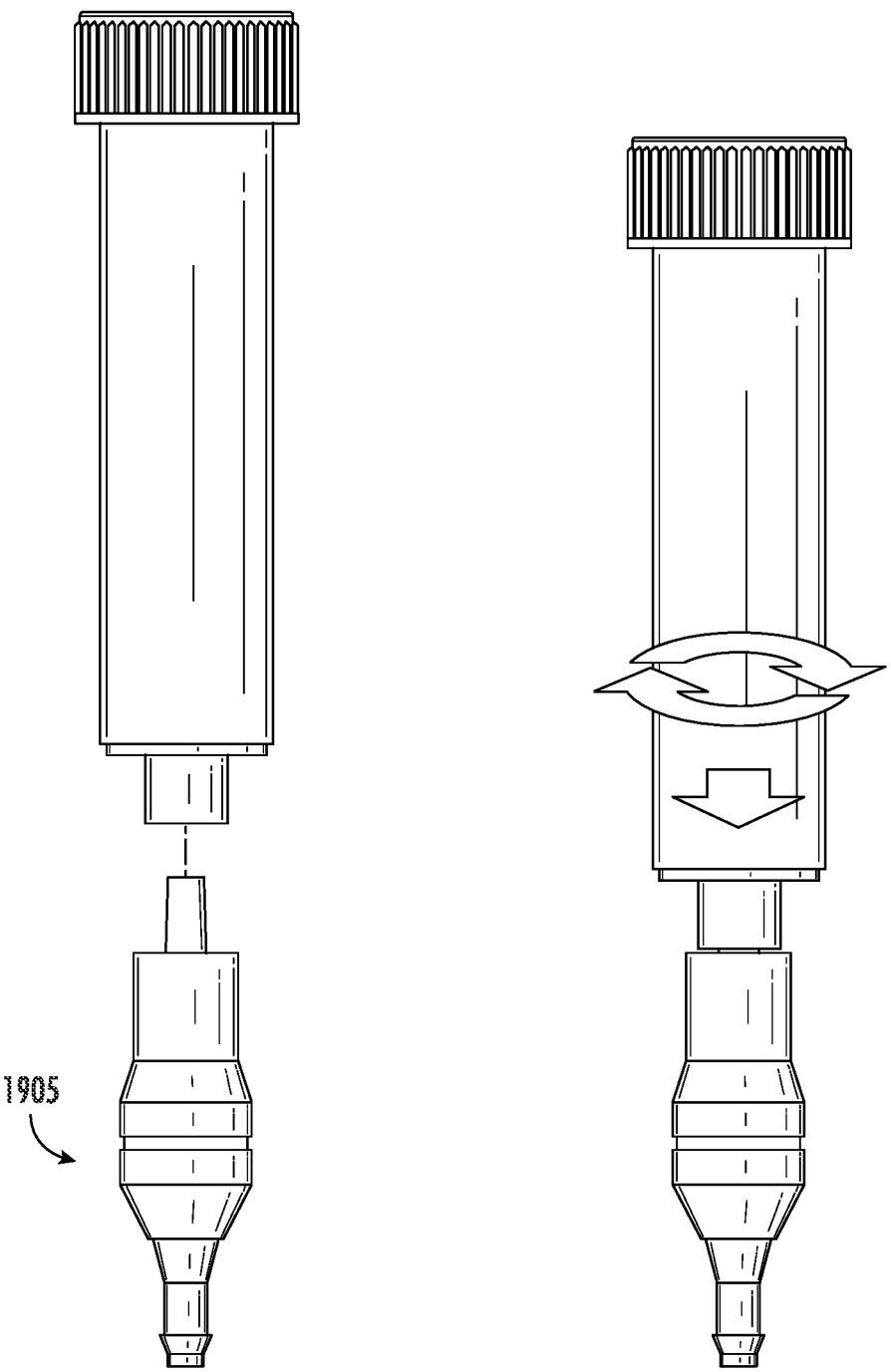
FIGS. 19A and 19B are a diagram of a reservoir and a cross section of a reservoir, respectively, showing the reservoir check valve in accordance with some embodiments of the present inventive concept.

In these embodiments, the user may operate this combination of primary, secondary, and tertiary devices in the following way to deliver liquid to a sample. In operation in accordance with these embodiments, a user may select the volume of liquid in the reservoirs depending on the number of samples that must be exposed to the liquid or combination of liquids. There may be options of pre-filled reservoir volumes that the user can choose from, or the user may fill the reservoirs with the appropriate amount of liquid prior to use. In some embodiments, the reservoir 1703 may include a cap 1706, a reservoir body 1711, and a check valve 1717 as showing FIGS. 17A and 17B. Once the appropriate size reservoir is determined, a user places the reservoir into a reservoir port on the secondary device 1800 as showing in FIG. 18A. In some embodiments, the check valve 1717 in the reservoir 1703 is only opened when the reservoir is attached to a reservoir port of the secondary device 1800. Similarly, a check valve 1717 in the port of the secondary device 1800 is only opened when a reservoir is attached to it. In this way, neither the port nor the reservoir is open until they are connected to each other. The reservoir check valve 1717 and port check valve 1905 (FIGS. 19A and 19B) may be opened by pushing the two together (FIG. 19A) and twisting (FIG. 19B). Once the action opens both valves, fluid is allowed to pass.

Figure 20B:
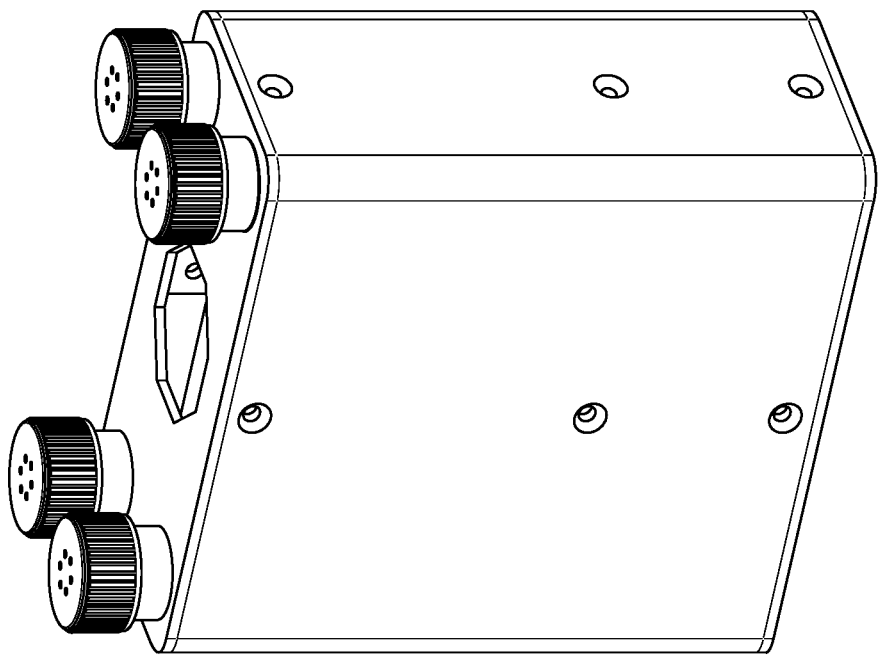
FIGS. 20A and 20B are diagrams illustrating secondary devices having ports for more than one reservoir in accordance with some embodiments of the present inventive concept.
Figure 20A:
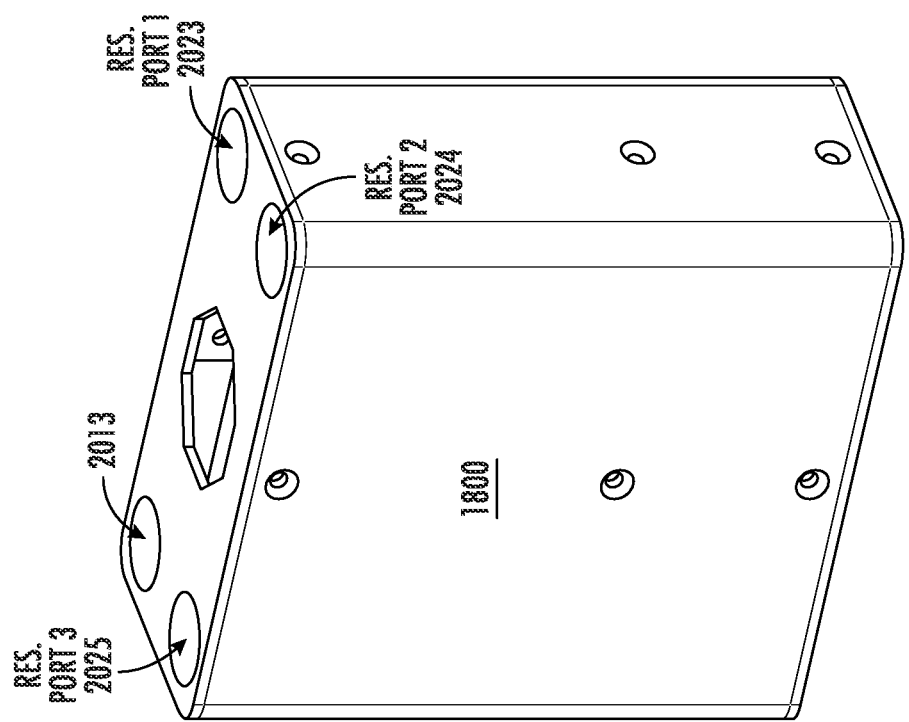

In some embodiments, at least one port of the secondary device 1800 is reserved as the liquid waste removal port 2013 as shown in FIG. 20A. A reservoir placed in this port 2013 can be used to store liquid that has already been used in the chamber, as discussed further below. Thus, the liquid removal port 2013 is generally empty when positioned in the secondary device 1800. As further illustrated in FIGS. 20A and 20B, more than one additional port, reservoirs ports 1

(2023), 2 (2024) and 3 (2025) are also provided on the secondary device 1800. Although embodiments discussed and figures referenced herein have four ports, it will be understood that embodiments of the present inventive concept may have any number of ports to accommodate numerous liquids without departing from the scope of the present inventive concept. FIG. 20B illustrates a full prepared secondary device, having three reservoirs including liquids and one empty removal port positioned therein.

Figure 17A:
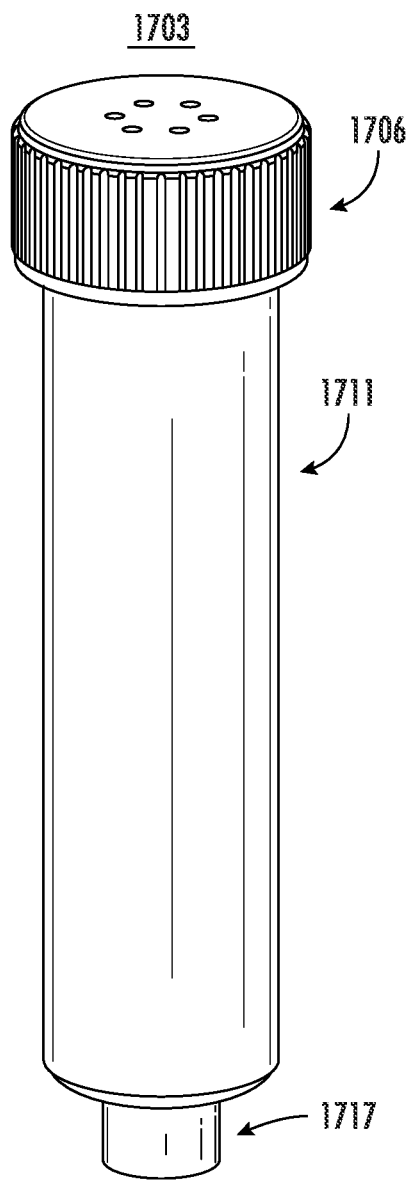
FIGS. 17A and 17B are a diagram of a reservoir and a cross section of a reservoir, respectively, in accordance with some embodiments of the present inventive concept.
Figure 17B:
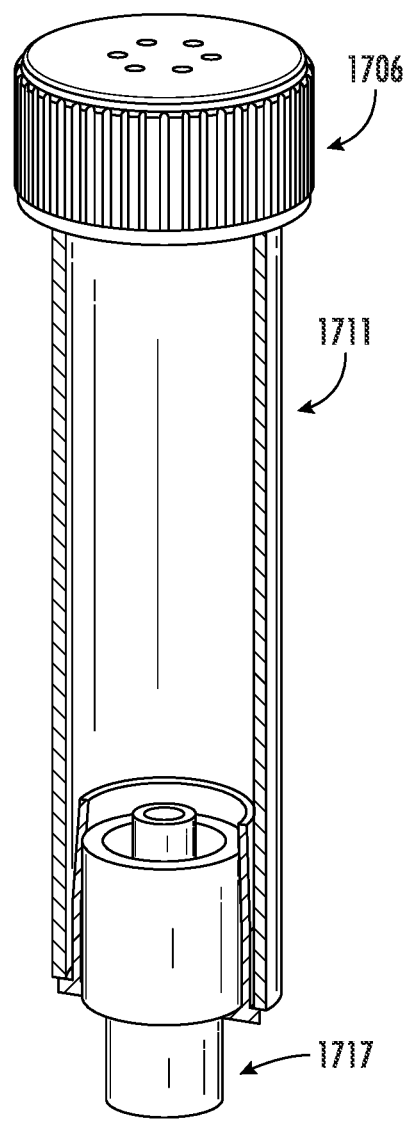

In some embodiments, the cap 1706 of the reservoir 1703 may be vented so gas can pass through the cap, but not liquid, as shown in, for example, FIGS. 17A and 17B. In these embodiments, the force required to draw liquid from the reservoir or push liquid into the reservoir would not change depending on the volume of liquid present in the reservoir because gas can escape or enter during inflow or outflow of liquid.

Figures 21A, 21B:
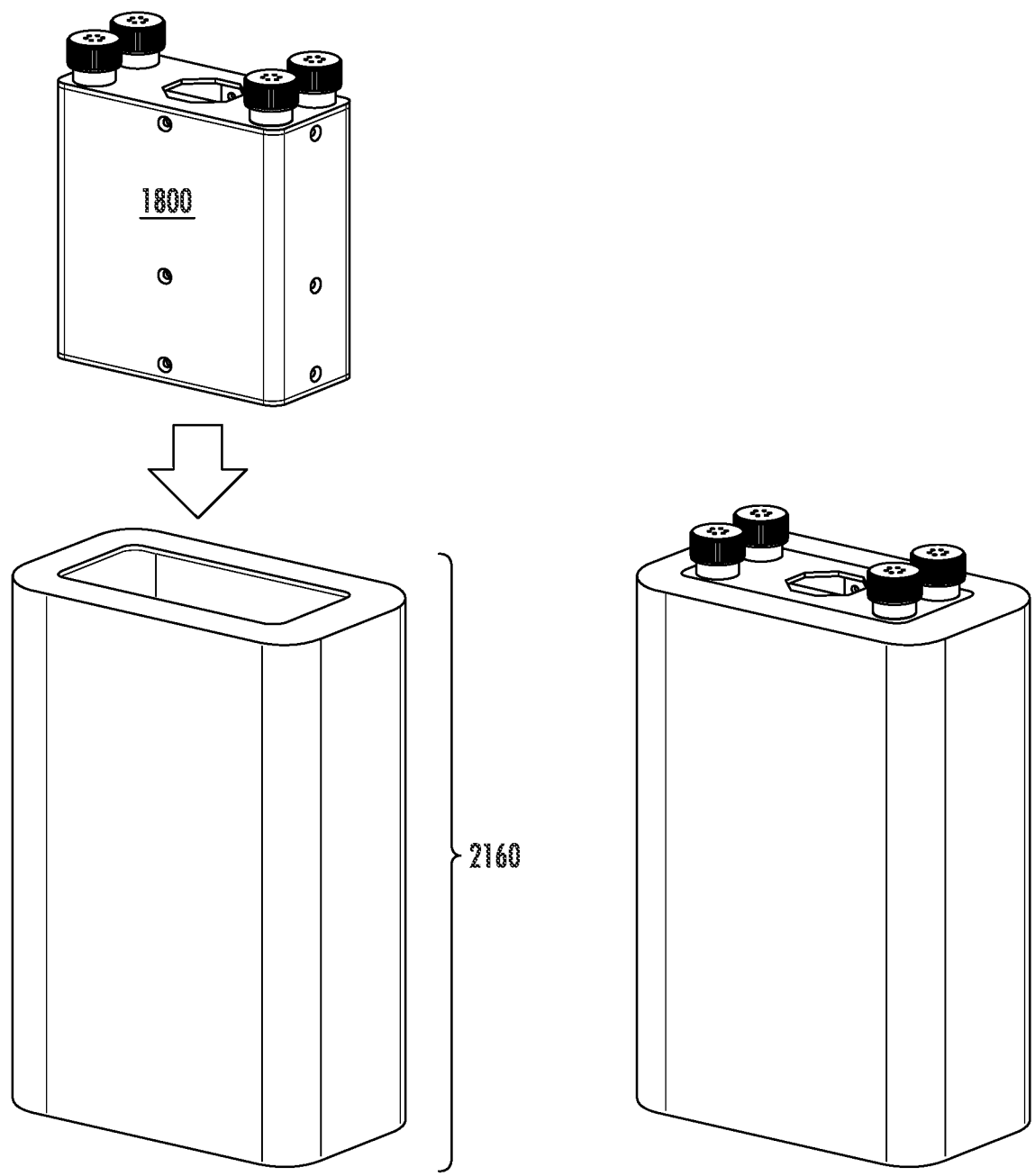
FIGS. 21A and 21B are diagrams illustrating insertion of a tertiary device into a secondary device in accordance with some embodiments of the present inventive concept.
Figure 22C:
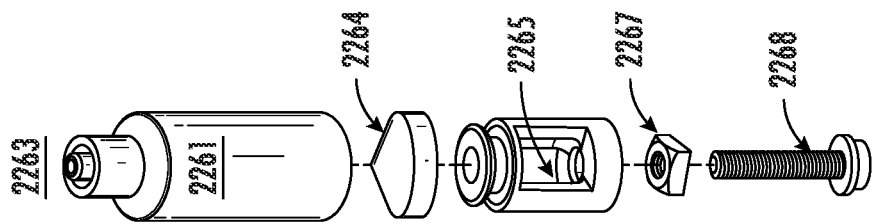
FIGS. 22A through 22C are diagrams of a tertiary device and a cross section of a tertiary device, respectively, including reciprocating pumps in accordance with some embodiments of the present inventive concept.
Figure 22B:
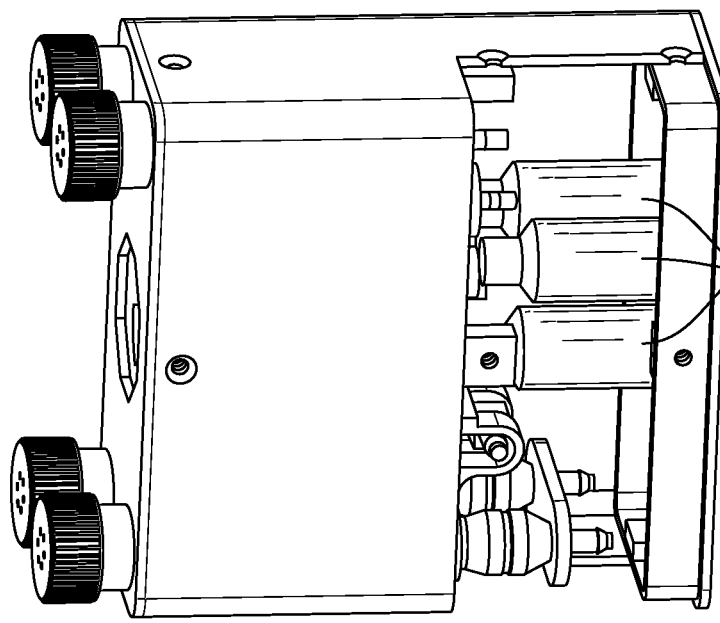
Figure 22A:
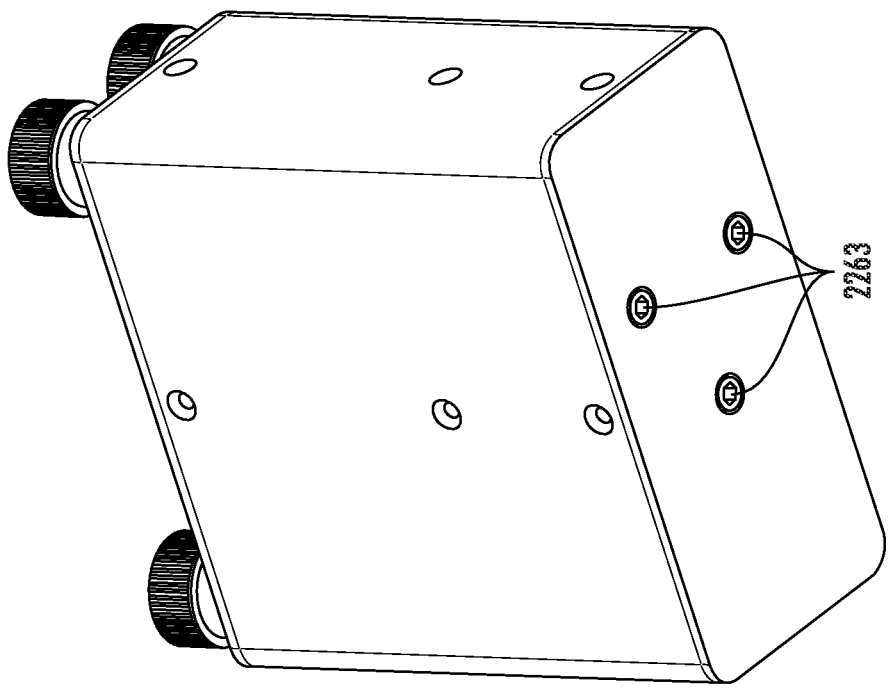
Figure 23B:
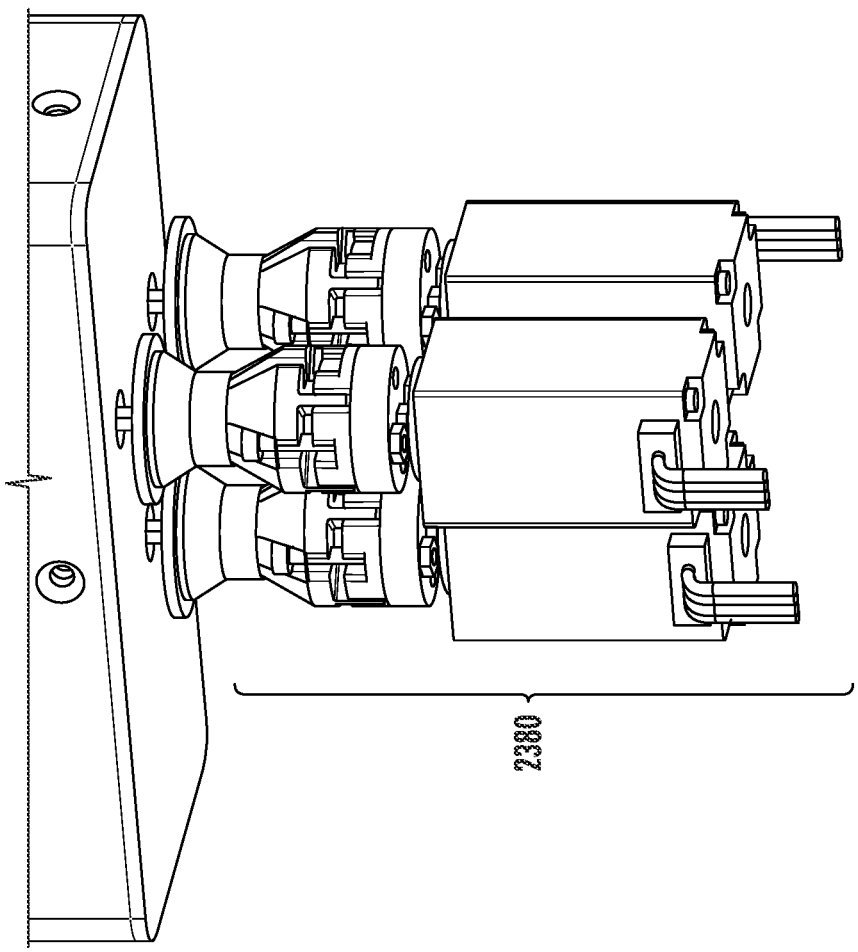
FIGS. 23A and 23B are diagrams illustrating stepper motors interacting with the tertiary device in accordance with some embodiments of the present inventive concept.
Figure 23A:
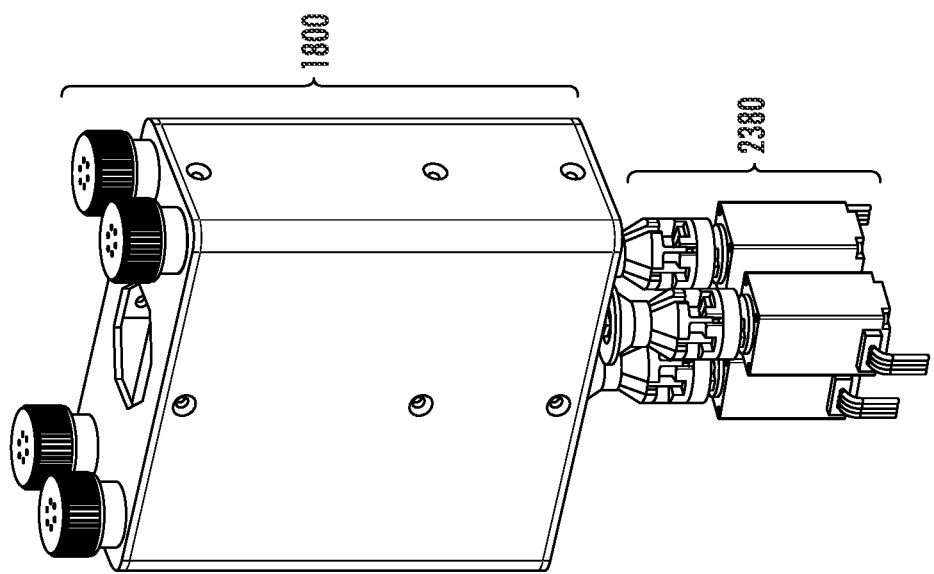

Once a user has placed the desired reservoirs in the secondary device 1800, the secondary device 1800 may be placed in the tertiary device 2160 as shown in FIGS. 21A and 21B. Components within the secondary 1800 and tertiary devices 2160 may combine to comprise the liquid delivery and removal mechanisms. As discussed above, in some embodiments, the liquid delivery and removal mechanisms may not be separate mechanisms, but the same set of components used to perform both tasks. Herein, where liquid delivery and liquid removal mechanisms are combined, they will be referred to as the "liquid movement mechanism." The liquid movement mechanism may include a pump, check valves, and a stepper motor. As illustrated in FIG. 22C, the pump 2263 may be a reciprocating pump, which may include a plunger 2265, a plunger rubber tip 2264, a nut 2267, a screw 2268, and a pump body 2261 (FIGS. 22A through 22C). This pump may function substantially similar to the pump discussed above with respect to FIGS. 12A through 12C.

Figure 24:
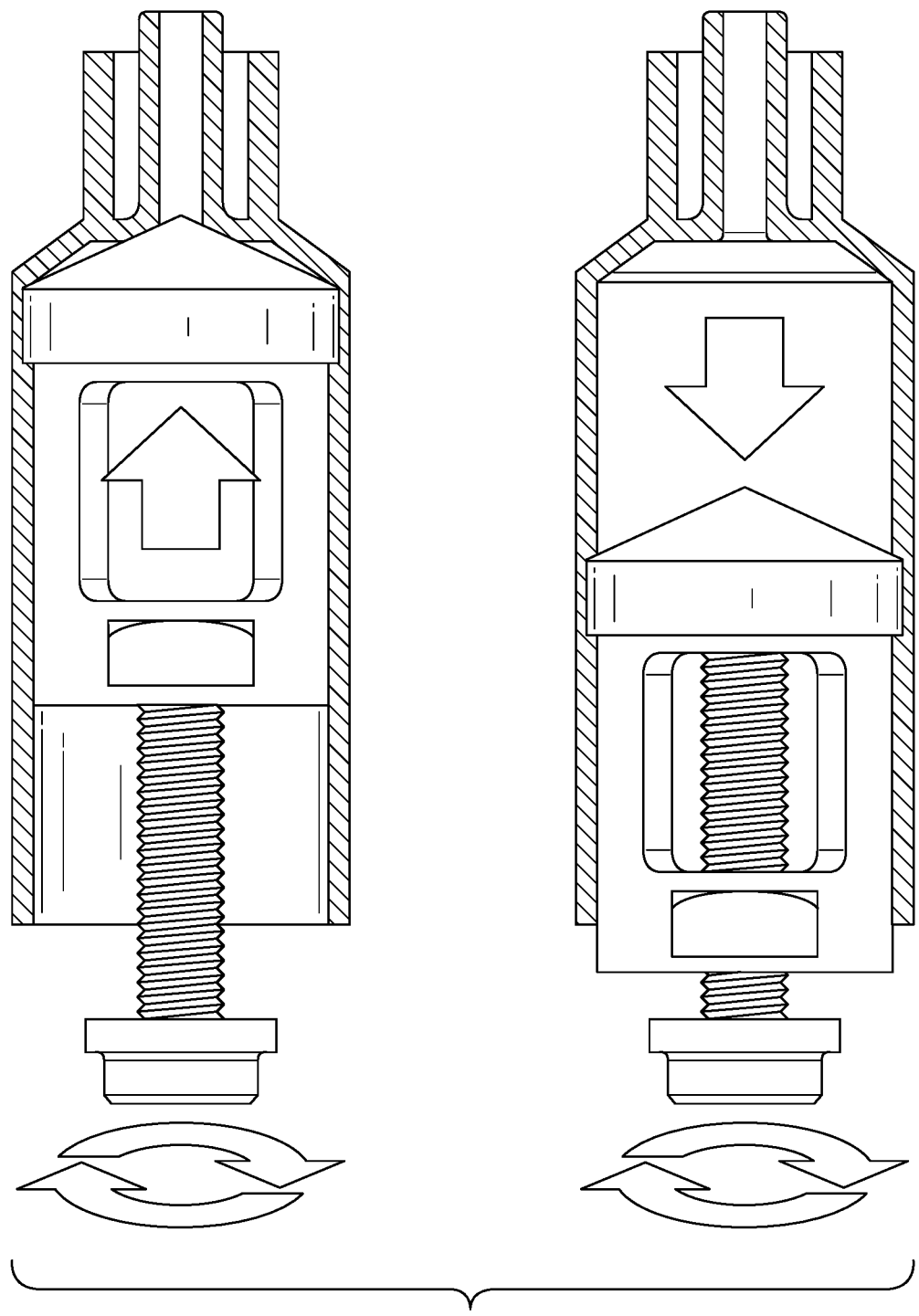
FIG. 24 are partial cross sections of a reciprocating pump in accordance with some embodiments of the present inventive concept.

The reciprocating pump 2263 may function in the following way to move liquid from the reservoir and deliver it to the chamber of the primary device. In some embodiments, the plunger 2265 of the reciprocating pump is actuated via the screw 2268 and nut 2267 that are attached to the plunger 2265. The screw 2268 of the pump faces the outside of the secondary device 2800. When placed in the tertiary device 2160, the socket of the screw seats with a driver bit. The driver bit is attached to a stepper motor 2380 as it was in the previously described liquid removal mechanism (FIGS. 23A and 23B, FIGS. 14A and 14B). When the stepper motor spins the driver bit, the driver bit spins the screw. When the screw is spun clockwise, the plunger of the pump 2265 is drawn downward. When the screw is spun counterclockwise, the plunger 2265 is pushed up as shown in FIG. 24. By combining this reciprocating motion with a pair of check valves, this system can be used to pump liquid from a reservoir to the chamber or from the chamber to a reservoir in accordance with some embodiments of the present inventive concept.

It will be understood that embodiments of the present inventive concept are not limited to the use of a stepper motor to provide reciprocating motion to the pump. For example, in some embodiments, the plunger may be reciprocated by a servo motor, or other method of linear motion. In some embodiments, the liquid movement mechanism may include a different form of positive displacement pump, such as a peristaltic pump, vane pump, or lobe pump without departing from the scope of the present inventive concept.

Figure 25:
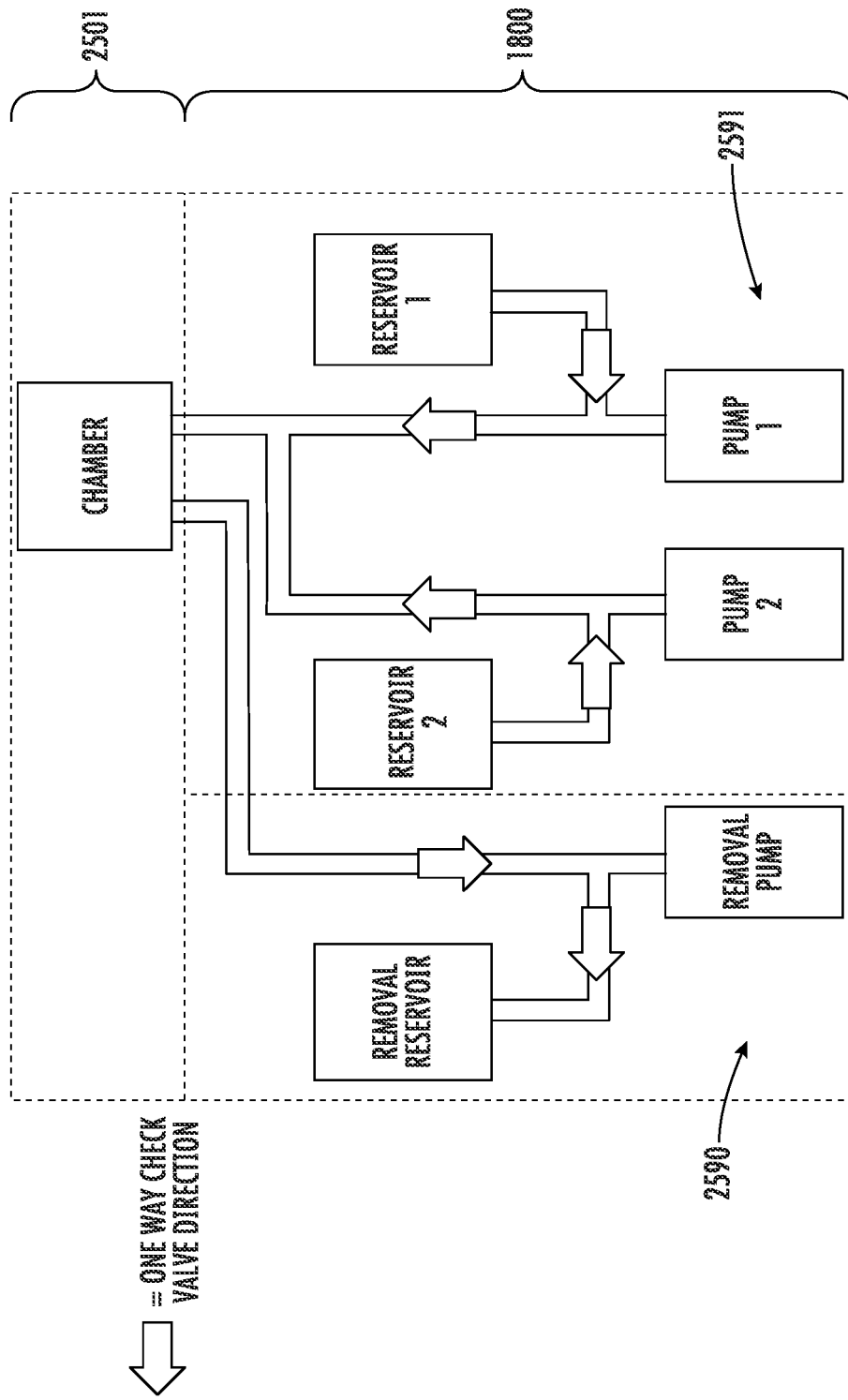
FIG. 25 is a schematic illustrating the connections between the liquid delivery and liquid removal branches in the primary and secondary devices in accordance with some embodiments of the present inventive concept.

The secondary device 1800 includes a liquid delivery branch 2591 and a liquid removal branch 2590. Each branch has one or more pumps, and each pump is connected to one or more reservoirs. The delivery and removal branches each terminate in a port at the top of the secondary device 1800. These two ports are where the primary device 2501 connects to the secondary device 1800 as shown, for example, in FIG. 25.

Figure 26:
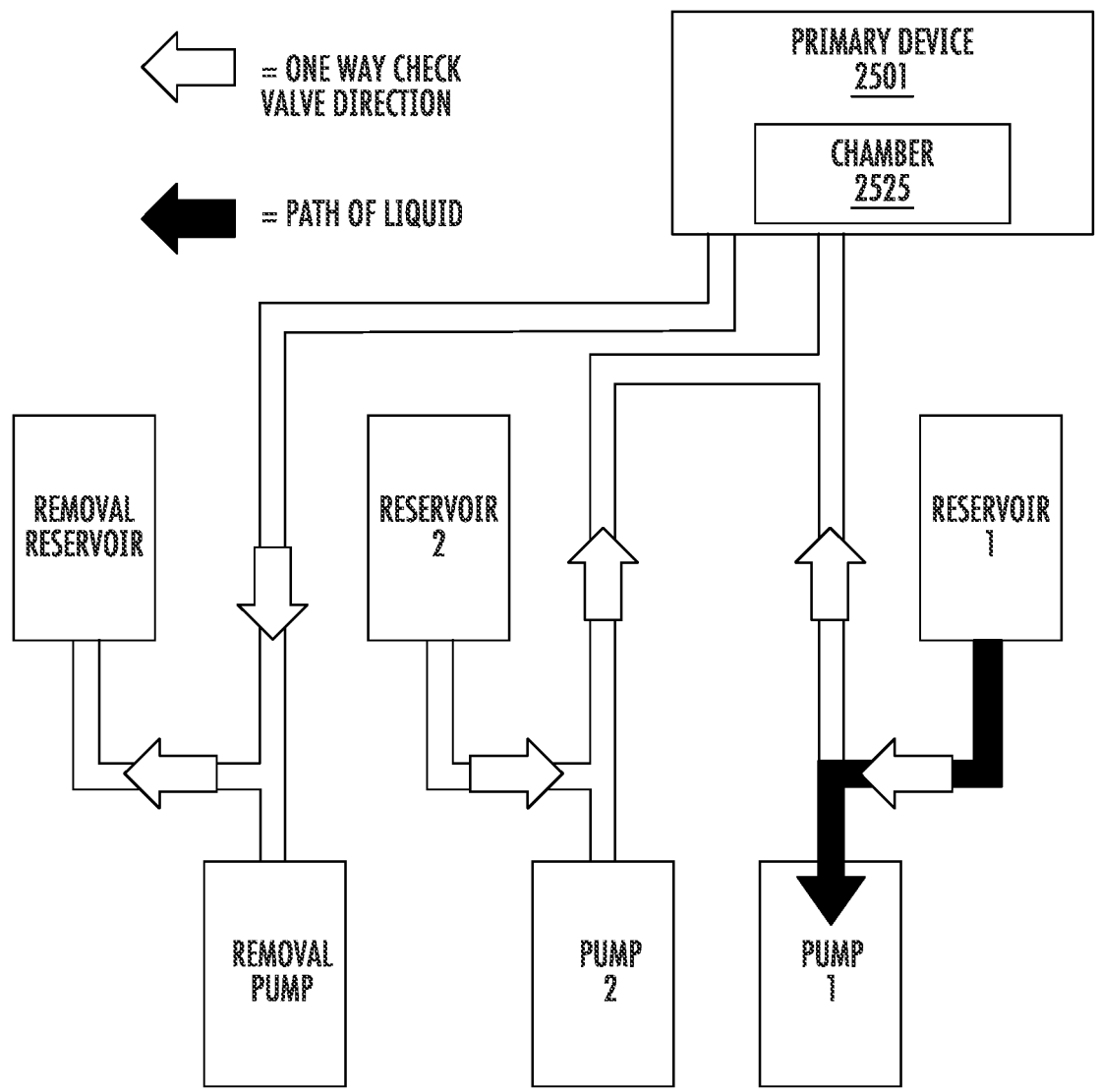
FIG. 26 is a schematic illustrating the various pumps and their interaction with reservoirs in accordance with some embodiments of the present inventive concept.
Figure 27:
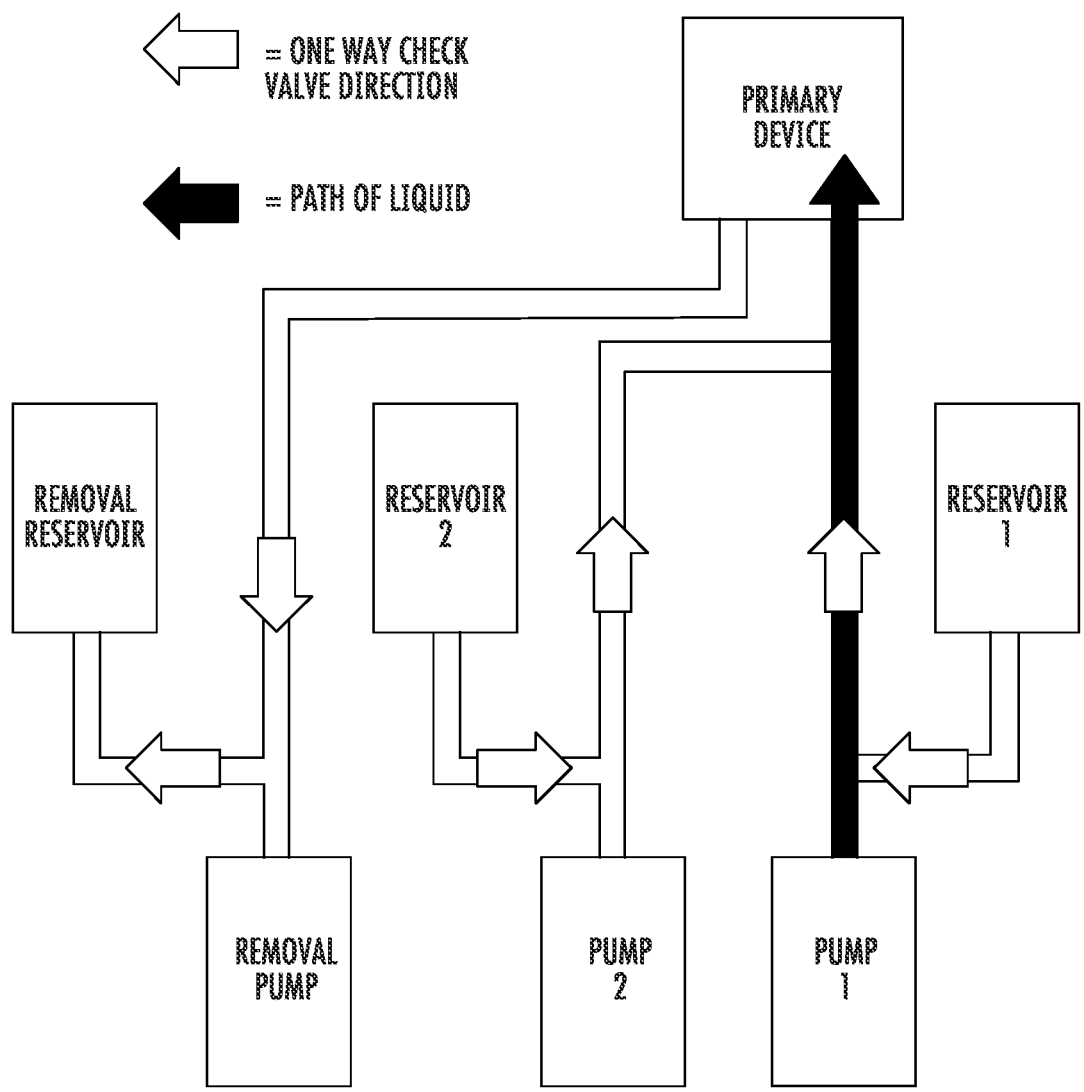
FIG. 27 is a schematic illustrating the various pumps and their interaction with reservoirs in accordance with some embodiments of the present inventive concept.
Figure 28:
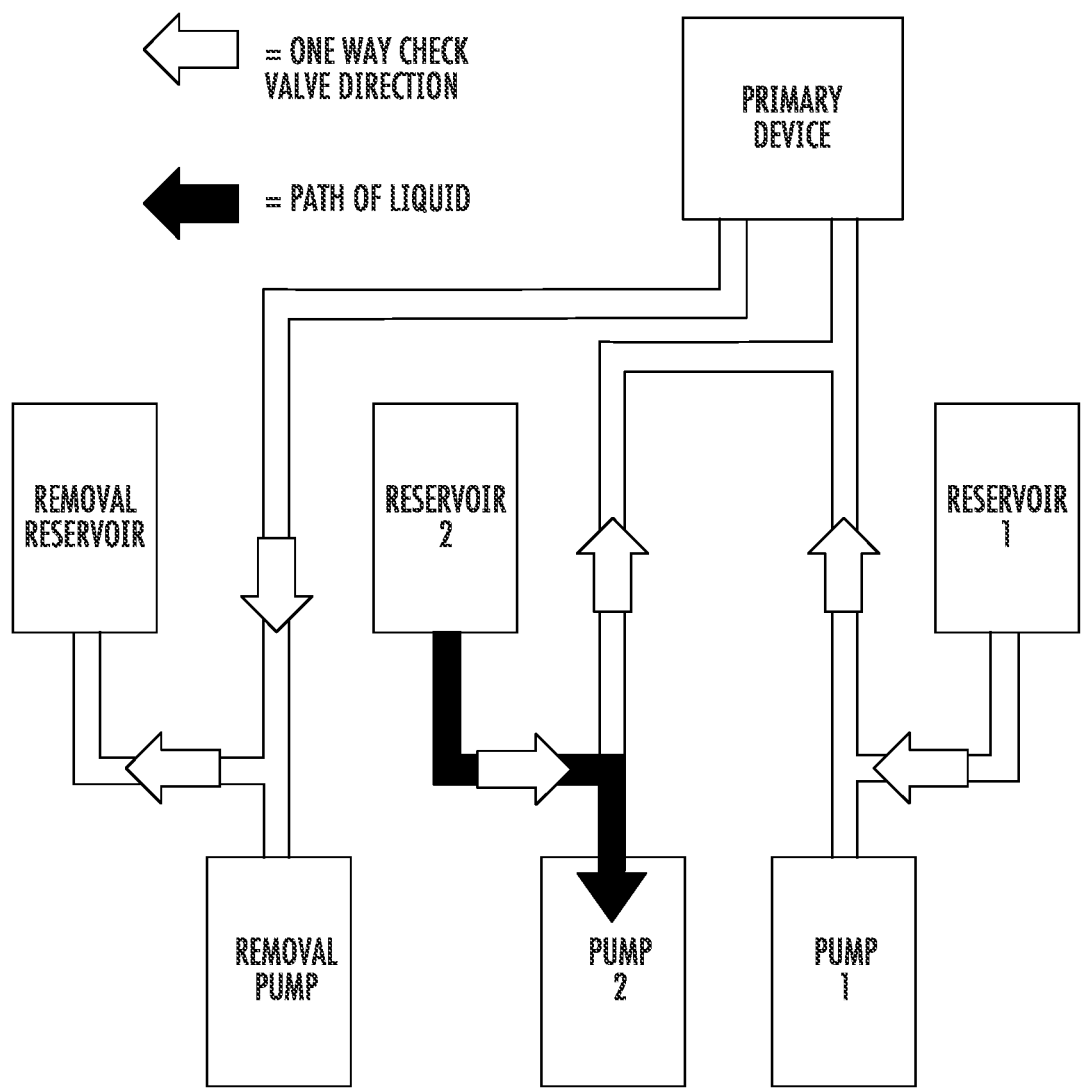
FIG. 28 is a schematic illustrating the various pumps and their interaction with reservoirs in accordance with some embodiments of the present inventive concept.
Figure 29:
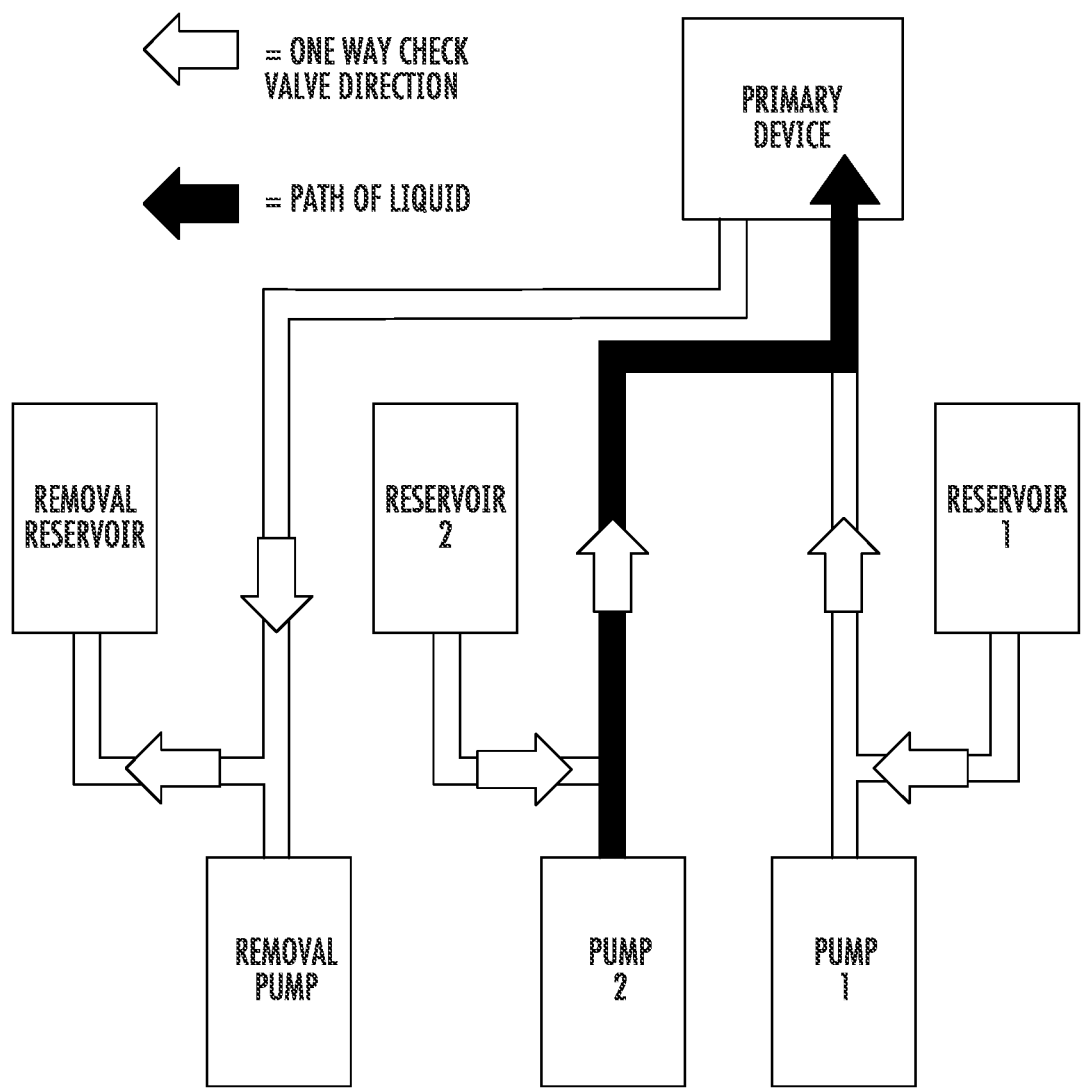
FIG. 29 is a schematic illustrating the various pumps and their interaction with reservoirs in accordance with some embodiments of the present inventive concept.

To deliver liquid from the reservoir (reservoir 1, FIG. 26), a plunger in the delivery branch 2591 is drawn down in the pump (pump 1 of FIG. 26). This draws liquid from reservoir 1 through a one-way check valve and into the pump body (pump 1) (FIG. 26). Next, the plunger is pushed back up. The path to the reservoir is sealed by the first one-way check valve, so the liquid must take the other path, through a second one-way check valve and into the chamber 2525 of the primary device 2501 (FIG. 27). Each reservoir in the secondary device 1800 is connected to the liquid movement mechanism. In some embodiments, liquid from multiple reservoirs may combine in a single pump before being delivered to the chamber 2525. In these embodiments, one liquid movement mechanism may be attached to multiple reservoirs, drawing liquid from each as the pump reciprocates. In further embodiments, multiple reservoirs may use multiple pumps, allowing for the delivery of liquids one at a time as shown in, for example, FIGS. 28 and 29.

Figure 30:
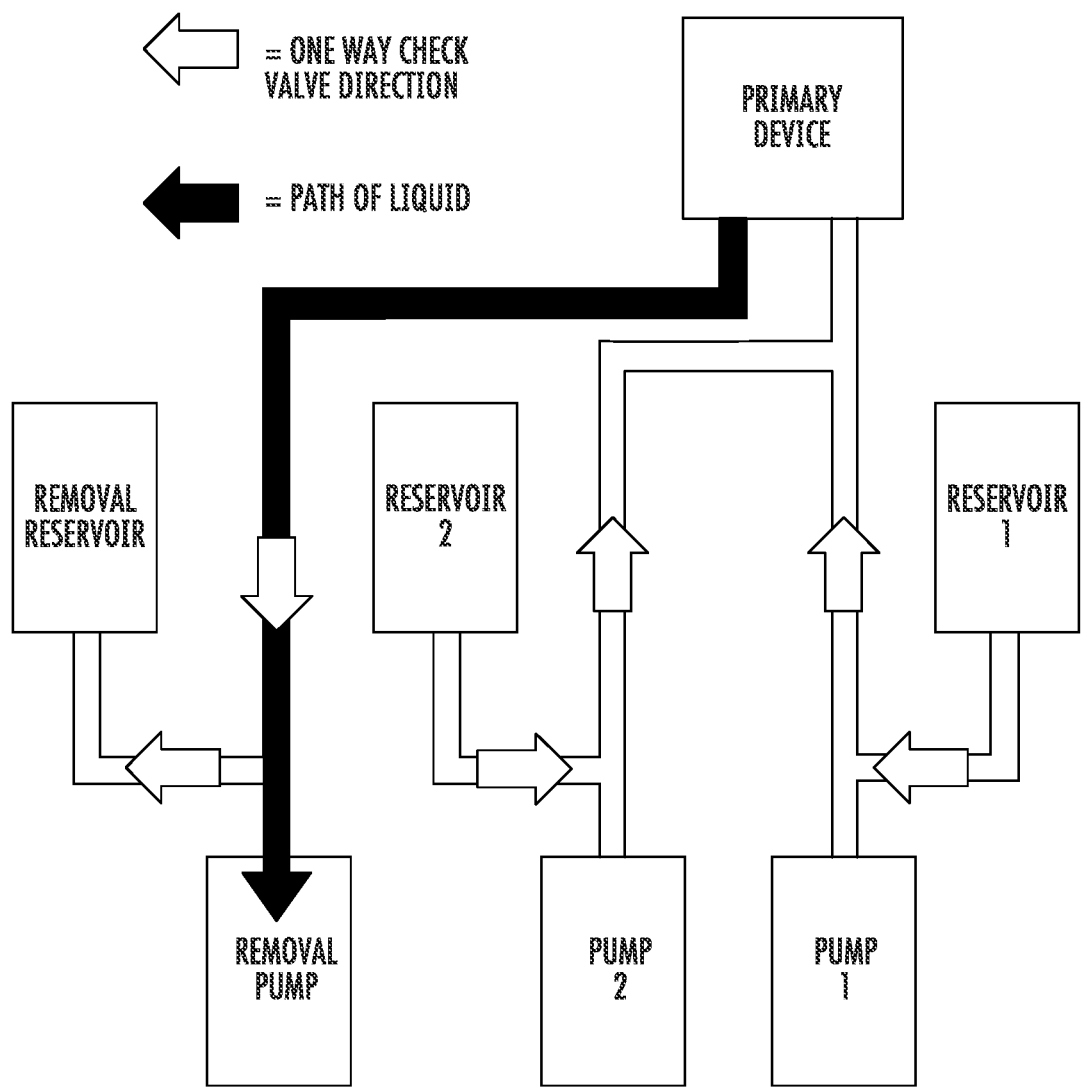
FIG. 30 is a schematic illustrating the various pumps and their interaction with reservoirs in accordance with some embodiments of the present inventive concept.
Figure 31:
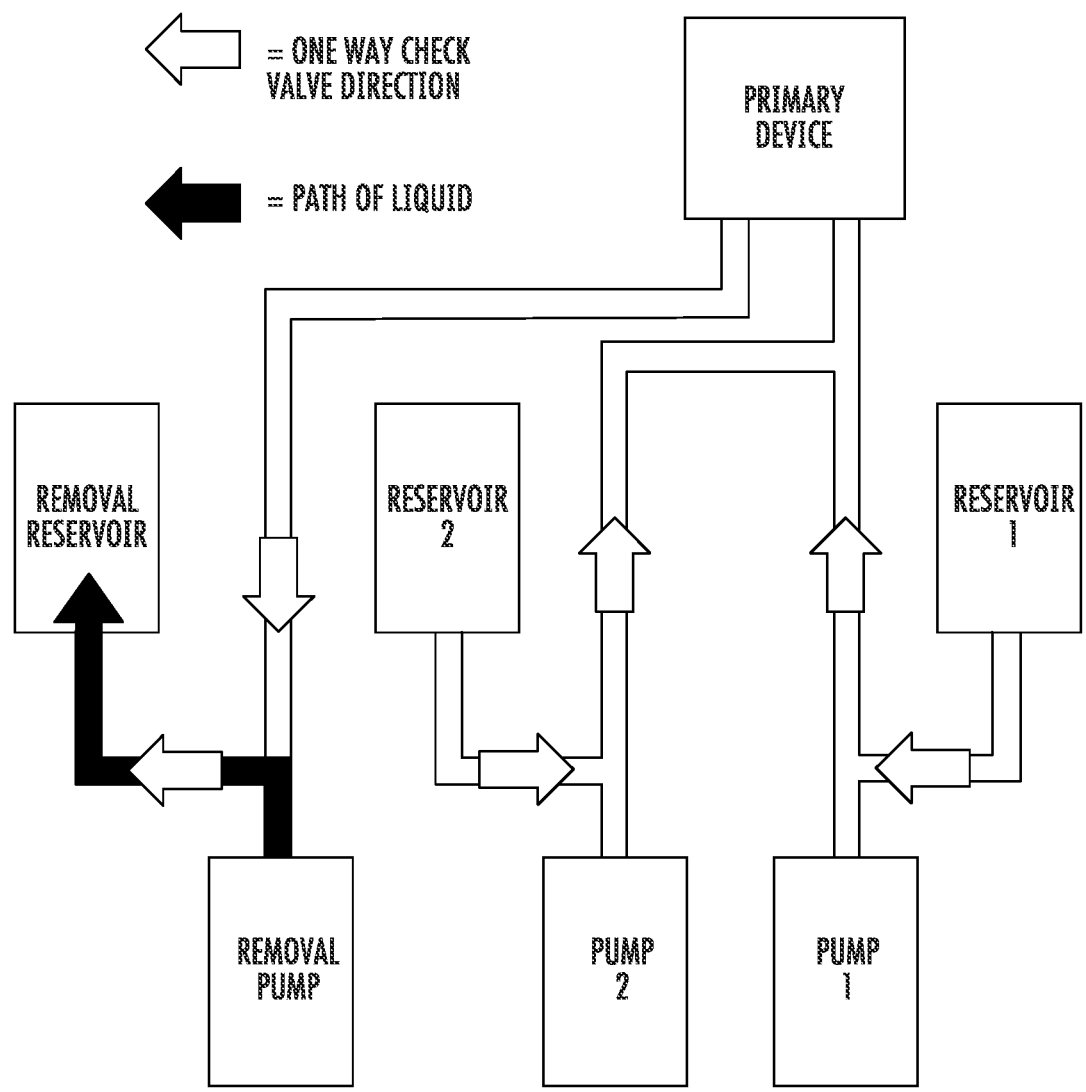
FIG. 31 is a schematic illustrating the various pumps and their interaction with reservoirs in accordance with some embodiments of the present inventive concept.

As shown in FIG. 30, liquid is removed from the chamber in the same way, but the check valves in the removal branch are reversed. In this way, when a plunger in the liquid removal branch is drawn down, liquid is removed from the chamber and stored in the liquid removal branch pump body after passing through a one-way check valve. When the liquid removal branch pump plunger is pushed up, liquid cannot reenter the chamber through the first one-way check valve, so it travels through a second one-way check valve and into the removal reservoir as shown in FIGS. 30 and 31.

Figure 32C:
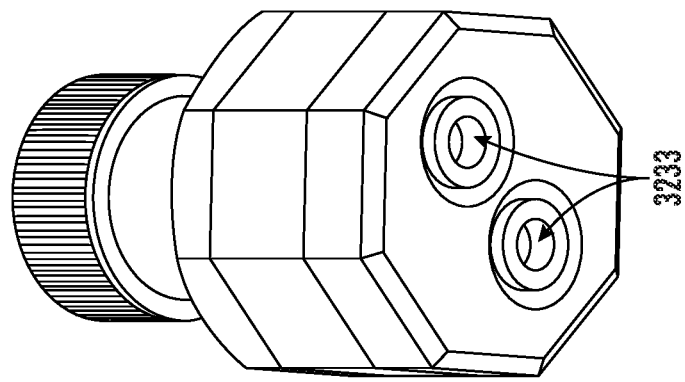
FIGS. 32A, 32B and 32C are diagrams illustrating a chamber in accordance with some embodiments of the present inventive concept.
Figure 32B:
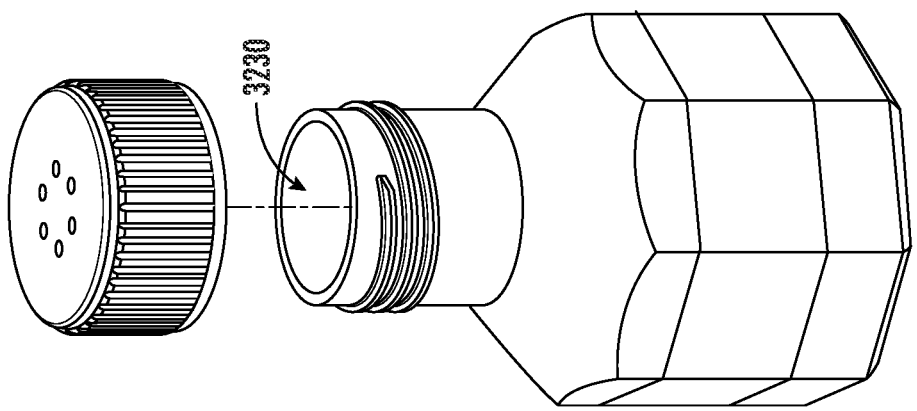
Figure 32A:
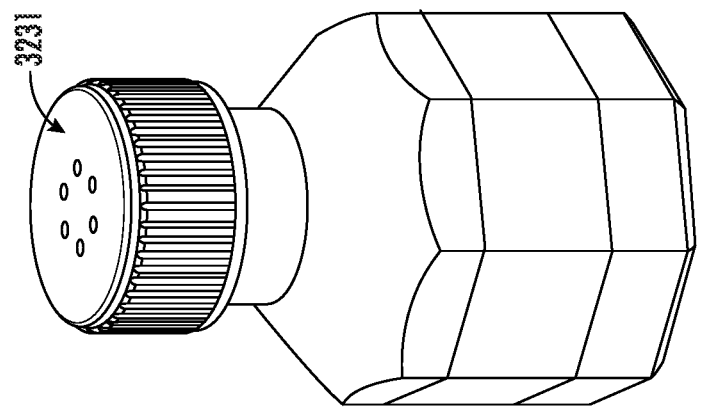
Figure 33B:
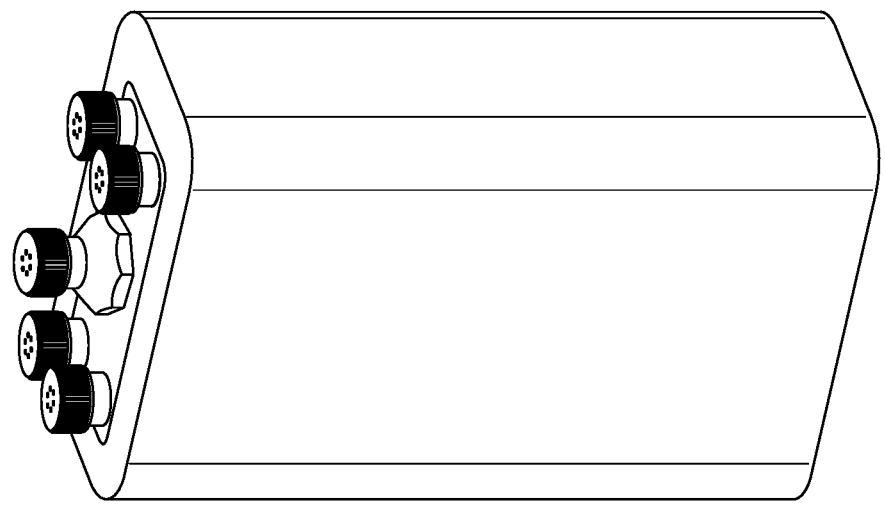
FIGS. 33A and 33B are diagrams illustrating a chamber (primary device) being inserted into a secondary device in accordance with some embodiments of the present inventive concept.
Figure 33A:
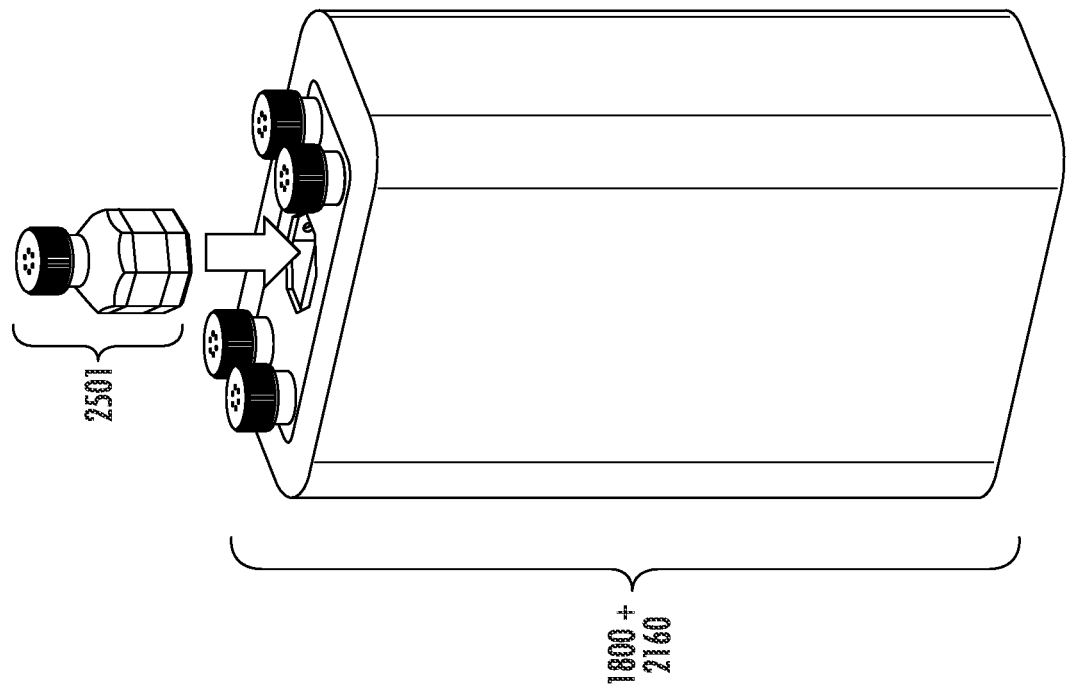

The above described combination of secondary and tertiary devices may be used in combination with different types of primary devices. For example, in some embodiments the primary device may include a chamber 3230, a cap 3231, and a pair of check valves 3233 (FIGS. 32A through 32C). In these embodiments, the check valves 3233 may face the outside of the primary device 2501 and be used to connect the primary device 2501 to the liquid delivery and liquid removal branches of the secondary device 1800 when the primary device is placed in the secondary device as shown in FIGS. 33A and 33B. These check valves are closed until the primary device is connected to the secondary device, allowing for the chamber of the primary device to be prefilled with liquid prior to use, if desired. Such a device as described above, and as depicted in FIGS. 32A through 33B, may be used to deliver liquid from the reservoirs to a sample placed in the sample chamber. In some embodiments this sample may be a biological sample, such as a biopsy, gross tissue specimen, or other type of tissue specimen. To use the device, the user places a sample in the chamber and seals the chamber using a cap (FIGS. 32A and 32B). The user then connects the primary device to the secondary device that is already housed within the tertiary device (FIGS. 33A and 33B). The stepper motors and pumps with the secondary and tertiary devices operate to move liquids from the reservoirs to the chamber of the primary device where the sample is exposed to the liquid. The liquid is then moved from the chamber to the removal reservoir, primary device is taken out of the secondary device, and the sample is retrieved from the chamber. This process can be repeated with additional primary devices for as many samples that need to be exposed to the liquid within the reservoirs, as determined by the user.

Figure 34A:
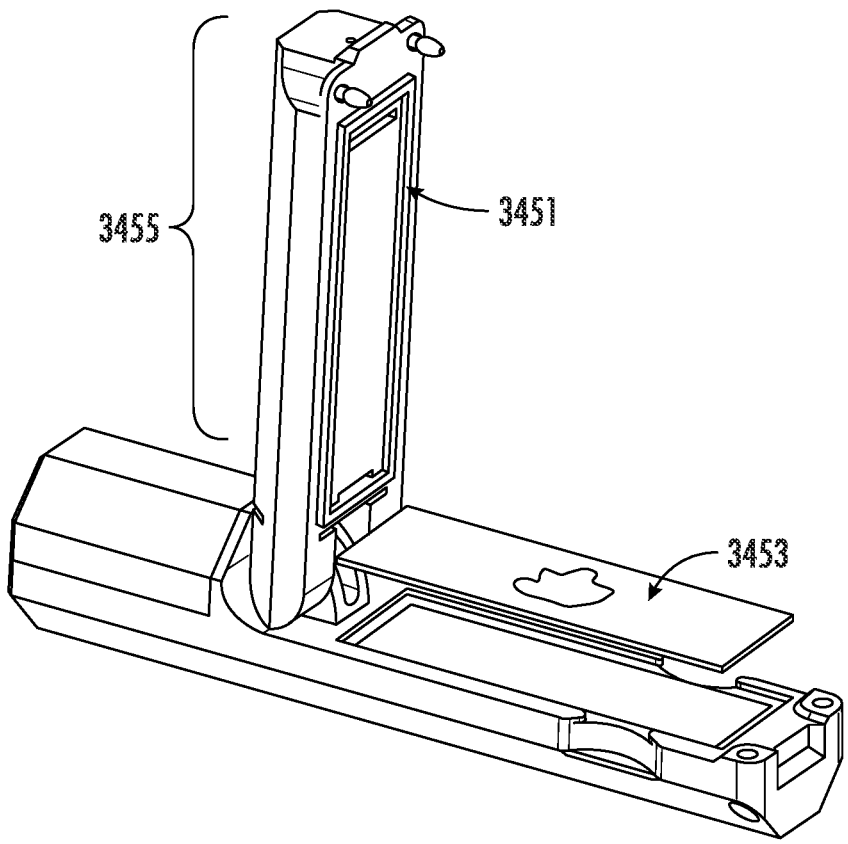
FIGS. 34A and 34B are diagrams illustrating a glass microscope slide inserted in a primary device including a slide gasket, a top jaw, a bottom jaw, and two ports in accordance with some embodiments of the present inventive concept.
Figure 34B:
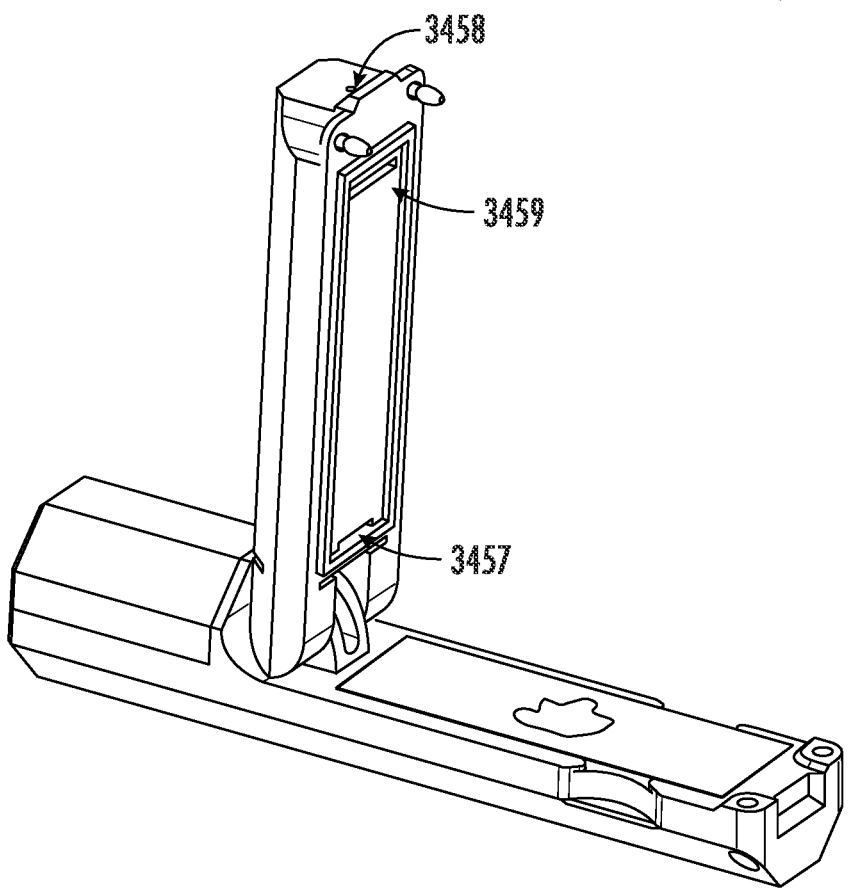
Figures 37A, 37B:
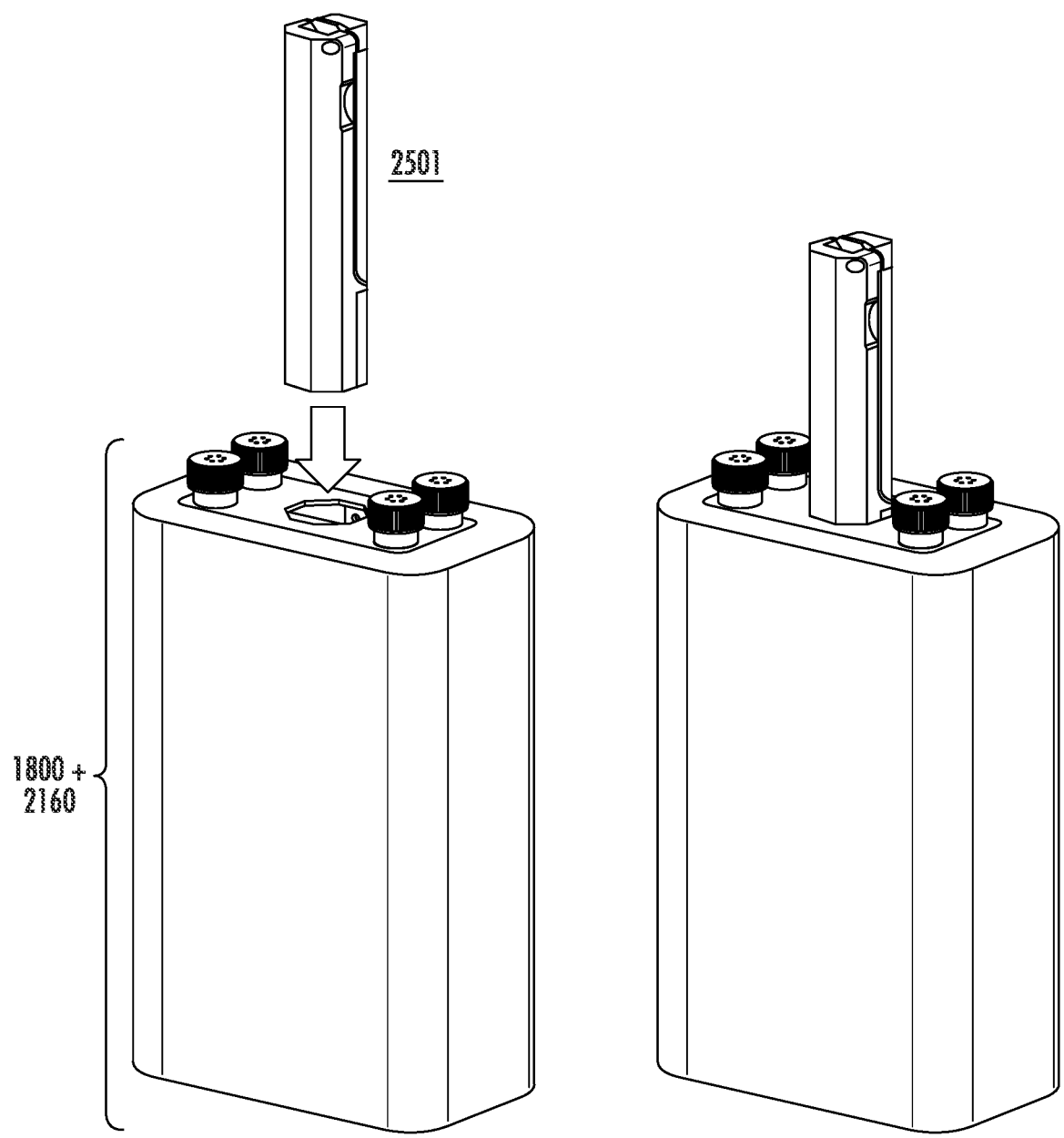
FIGS. 37A and 37B are diagram illustrating insertion of the primary device of FIG. 36 into the secondary and tertiary devices in accordance with some embodiments of the present inventive concept.

In further embodiments, the primary device may be configured for delivery of liquid to a sample that is fixed to a hard substrate as illustrated, for example, in FIGS. 34A through 27B. In some embodiments this substrate may be a glass microscope slide. Thus, as shown, the primary device in these embodiments includes a slide gasket 2451, a top jaw 3455, a bottom jaw 3456, and two ports 3554 (FIGS. 34A through 35B). To deliver liquid to a sample fixed to a glass microscope slide 3453, a user places the slide 3453 in the bottom jaw 3456 sample side up and closes the top jaw 3455. A rubber gasket 3451 in the top jaw 3455 pushes down around the edge of the slide 3454, creating a seal between the glass slide 3453, the rubber gasket 3451, and the top jaw 3455 (FIG. 36). The primary device, with glass slide inside, is placed inside the secondary device 1800, where the two ports on the primary device connect to the liquid delivery and liquid removal branches of the secondary device 1800 (FIGS. 37A and 37B). As further illustrated, the primary device further includes a vent outlet 3458, a vent inlet 3459 and a chamber inlet 3457.

Such a device as described above, and as depicted in FIGS. 34A through 37B, may be used to deliver liquid from the reservoirs to a sample mounted to a glass microscope slide. In some embodiments this sample may be a biological sample, such sectioned biopsy, sectioned gross tissue specimen, other type of sectioned tissue specimen, a liquid biopsy, other liquid sample, or touch-prep specimen. To use the device, the user places a slide in the bottom jaw of the primary device, sample side up, and closes the top jaw. A chamber is made by the interaction between the slide gasket and glass slide (FIG. 36). The user then connects the primary device to the secondary device that is already housed within the tertiary device (FIGS. 37A and 37B). The stepper motors and pumps within the secondary and tertiary devices operate to move liquids from the reservoirs to the chamber of the primary device where the sample is exposed to the liquid. The liquid is then moved from the chamber to the removal reservoir, primary device is taken out of the secondary device, and the glass slide is retrieved from the primary device. This process can be repeated with additional primary devices for as many samples that need to be exposed to the liquid within the reservoirs, as determined by the user.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

What is claimed is:

1. A system for delivery of liquid to and removal of liquid from a sample, the system comprising:
    a primary device that contains the sample and at least one valve configured to allow liquid to be delivered to and removed from the sample;
    at least one reservoir that is configured to receive a volume of liquid;
    a secondary device including at least one port configured to receive the at least one reservoir and configured to be coupled to the primary device; and
    a tertiary device configured to receive the secondary device and comprising a liquid delivery mechanism that delivers the volume of liquid from the at least one reservoir to the sample and a liquid removal mechanism that actively removes the volume of liquid from the sample,
    wherein the liquid removal mechanism comprises a motor-driven syringe pump;
    wherein positioning the primary device in the secondary device causes the volume of liquid in the at least one reservoir to be delivered to the sample contained within the primary device; and
    wherein the liquid removal mechanism deters liquid from traveling between the at least one reservoir and a secondary reservoir.

2. The system of claim 1:
    wherein the at least one reservoir comprises a plurality of reservoirs;
    wherein the at least one port of the secondary device comprises a plurality of ports, each of the plurality of ports configured to receive a corresponding one of the plurality of reservoirs; and
    wherein at least one of the plurality of ports comprises a liquid removal port that receives an empty reservoir.

3. The system of claim 2, wherein each of the plurality of reservoirs contain one of a same liquid or different liquids.

4. The system of claim 2, wherein each of the plurality of reservoirs are filled by a user.

5. The system of claim 1:
    wherein the at least one reservoir comprises a reservoir body having a cap on a first end of the reservoir body and a check valve on a second end of the reservoir body, opposite the first end of the reservoir body; and
    wherein the check valve of the at least one reservoir is configured to engage with a port check valve of the secondary device such that both the check valve and the port check valve open when the at least one reservoir is locked into place.

6. The system of claim 1, wherein the at least one reservoir is locked into the secondary device by pushing the at least one reservoir into the at least one port and twisting the at least one reservoir to lock the at least one reservoir into place.

7. The system of claim 1, wherein the primary device is configured to contain a microscope slide having the sample therein and wherein the volume of liquid is delivered from the at least one reservoir to the sample on the microscope slide.

8. The system of claim 1, wherein the primary device comprises a chamber including a vented cap and a pair of check valves configured to allow the volume of liquid to be delivered to the sample contained in the chamber and removed from the sample contained in the chamber.

9. The system of claim 1, wherein the secondary device is inserted into the tertiary device after the at least one reservoir has been positioned in the at least one port of the secondary device.

10. The system of claim 1, wherein the sample comprises a biological sample or other type of tissue specimen.

11. The system of claim 1, wherein the liquid removal mechanism deters liquid from traveling between the at least one reservoir and a secondary reservoir by blocking a tube connected therebetween.

12. The system of claim 1, further comprising an improper placement detection mechanism that senses misalignment and creates a detectable signal responsive to the sensed misalignment and communicated the same to a microprocessor.

13. The system of claim 1, wherein the motor-driven syringe pump comprises:
   a screw;
   a nut coupled to the screw;
   a plunger connected to the nut; and
   a syringe body defining a secondary liquid reservoir.

14. The system of claim 13, wherein the screw of the motor-driven syringe pump is configured to reciprocate the plunger within the syringe body to actively remove liquid from the sample and into the secondary liquid reservoir.

15. The system of claim 14, wherein the plunger remains fixed in position in absence of input from the motor deterring liquid movement.

16. The system of claim 15, wherein one or more one-way check valves are positioned in the secondary device to deter backflow of liquid between reservoirs.

* * * * *